United States Patent
Nagai

(10) Patent No.: US 9,866,702 B2
(45) Date of Patent: Jan. 9, 2018

(54) ECHO CANCELLATION DEVICE, NON-TRANSITORY COMPUTER READABLE MEDIUM STORING ECHO CANCELLATION PROGRAM, AND ECHO CANCELLATION

(71) Applicant: JVC KENWOOD Corporation, Yohama-shi, Kanagawa (JP)

(72) Inventor: Toshiaki Nagai, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/481,370

(22) Filed: Apr. 6, 2017

(65) Prior Publication Data

US 2017/0214800 A1    Jul. 27, 2017

Related U.S. Application Data

(63) Continuation of application No. PCT/JP2015/004520, filed on Sep. 7, 2015.

(30) Foreign Application Priority Data

Oct. 8, 2014   (JP) .................. 2014-206855

(51) Int. Cl.
*H04M 9/08* (2006.01)
*G10L 21/0232* (2013.01)
(Continued)

(52) U.S. Cl.
CPC ......... *H04M 9/082* (2013.01); *G10L 21/0232* (2013.01); *G10L 25/48* (2013.01); *G10L 25/78* (2013.01); *G10L 2021/02082* (2013.01)

(58) Field of Classification Search
CPC ................. H04B 3/23; H04M 9/082
(Continued)

(56) References Cited

U.S. PATENT DOCUMENTS 6,052,462 A † 4/2000 Lu
9,503,569 B1 * 11/2016 Adams .................. H04M 3/002
(Continued)

FOREIGN PATENT DOCUMENTS

GB    2284970 A † 7/1994
JP    H07-221832 A † 8/1995
JP    2011-130170 A † 6/2011

OTHER PUBLICATIONS

International Search Report dated Oct. 20, 2015 issued by the Japan Patent Office in counterpart International Application No. PCT/JP2015/004520.†

*Primary Examiner* — John J Lee
(74) *Attorney, Agent, or Firm* — Procopio, Cory, Hargreaves & Savitch LLP

(57) ABSTRACT

An echo cancellation device includes an echo signal reduction processing unit that generates a transmitting signal in which an echo signal component is reduced from the acoustic signal; and a filter coefficient update determination unit that instructs the echo signal reduction processing unit to update the filter coefficient when the output voice signal corresponds to a voice section and the acoustic signal includes the echo signal component. The filter coefficient update determination unit calculates a feature value of the acoustic signal and instructs to update the filter coefficient when a difference between a first feature value of a frequency band equal to or lower than the target frequency and a second feature value of a frequency band higher than the target frequency is equal to or greater than a preset update determination threshold.

9 Claims, 17 Drawing Sheets

(51) Int. Cl.
*G10L 25/78* (2013.01)
*G10L 25/48* (2013.01)
*G10L 21/0208* (2013.01)

(58) Field of Classification Search
USPC ............................... 455/67.13, 18, 501, 296
See application file for complete search history.

(56) References Cited

U.S. PATENT DOCUMENTS

| | | | |
|---|---|---|---|
| 2007/0092074 A1* | 4/2007 | Takada .................... | H04B 3/23 379/406.08 |
| 2011/0150067 A1† | 6/2011 | Takada | |
| 2014/0056423 A1* | 2/2014 | Nishikawa ............... | H04B 3/23 379/406.08 |
| 2014/0278381 A1† | 9/2014 | Dehghani et al. | |

\* cited by examiner
† cited by third party

ECHO CANCELLATION DEVICE, NON-TRANSITORY COMPUTER READABLE MEDIUM STORING ECHO CANCELLATION PROGRAM, AND ECHO CANCELLATION

CROSS-REFERENCE TO RELATED APPLICATIONS

This application is a bypass continuation of PCT/JP2015/004520 filed on 7 Sep. 2015 which is based upon and claims the benefit of priority from Japanese patent application No. 2014-206855, filed on Oct. 8, 2014, the disclosure of each is incorporated herein in its entirety by reference.

BACKGROUND

The present invention relates to an echo cancellation device, an echo cancellation program, and an echo cancellation method, and more particularly, to an echo cancellation device, an echo cancellation program, and an echo cancellation method which reduce echo signal components generated when a voice signal output from the echo cancellation device is input through a microphone of the echo cancellation device.

In recent years, hands-free communication devices have been used in many cases as auxiliary devices for making a call without the need to hold a communication device, such as a cellular phone, in a user's hand. The hands-free communication devices are grouped into a head set type in which a headset that is a combination of an earphone and a microphone is connected to a cellular phone or the like, and a speaker type in which a loudspeaker and a microphone are connected to a cellular phone or the like. Among the hands-free communication devices, the hands-free communication device of the type using a loudspeaker and a microphone prevents a cable or the like from getting entangled with a user. Accordingly, this type of hands-free communication device is particularly suitable for use in driving an automobile or the like.

However, in the speaker-type hands-free devices, a voice signal transmitted from the loudspeaker comes into the microphone, so that an echo to be transmitted to a call destination is generated. If an echo is generated during a call, the voice signals resonate with each other and the clarity of a speech may deteriorate, or howling may occur, which makes it difficult to continue the call. Techniques for improving the clarity of a speech by solving the problem of echo and the like are disclosed in, for example, Japanese Unexamined Patent Application Publication No. H07-221832 and Japanese Unexamined Patent Application Publication No. 2011-130170.

Japanese Unexamined Patent Application Publication No. H07-221832 discloses a frequency characteristic control method for obtaining a sufficient clarity of a speech even when the level of ambient noise is high. In Japanese Unexamined Patent Application Publication No. H07-221832, frequency spectrums of a transmitting acoustic signal and an incoming acoustic signal are detected. In accordance with the magnitude of a level difference between the frequency spectrums, the incoming call frequency spectrum is set to be equal to or higher than the level of a noise frequency spectrum in a frequency range equal to or higher than a lower-limit frequency necessary for obtaining a clarity of a speech of 70% or more. When a maximum level difference between the noise frequency spectrum and the incoming call frequency spectrum is equal to or lower than a predetermined limit value, the component level of the incoming call frequency spectrum lower than the required lower-limit frequency is increased according to the amount of component level change. When the maximum level difference exceeds the predetermined limit value, the component level of the incoming call frequency spectrum lower than the required lower-limit frequency is reduced, and at the same time, the component level of the incoming call frequency spectrum equal to or higher than the required lower-limit frequency is increased.

Japanese Unexamined Patent Application Publication No. 2011-130170 discloses an echo canceller that removes an echo. The echo canceller disclosed in Japanese Unexamined Patent Application Publication No. 2011-130170 includes: specific frequency component removing means for outputting, to an echo path, a signal in which a specific frequency component of a specific frequency is removed from a received signal; specific frequency component detection means for detecting, from a transmitting signal, a frequency component having the same frequency as the specific frequency removed by the specific frequency component removing means; noise calculation means for obtaining noise power based on the power of the specific frequency component detected by the specific frequency component detection means, and obtaining a total power including noise and an echo component on the basis of the power of frequency components including the echo component; and control parameter calculation means for obtaining a control parameter for the echo canceller by using the noise power and the total power obtained by the noise calculation means.

SUMMARY

However, the technique disclosed in Japanese Unexamined Patent Application Publication No. H07-221832 has a problem that the noise component and the echo signal component cannot be separated from each other, which makes it difficult to reduce the echo. Further, as the technique disclosed in Japanese Unexamined Patent Application Publication No. 2011-130170 has a problem that the voice component emitted from the speaker is included in the noise power in a double-talk state in which a speaker emits a voice at the same time a transmitting signal is output, it is difficult to accurately detect the echo component and leads to deterioration in the effect of echo cancellation. In other words, the use of the techniques disclosed in Japanese Unexamined Patent Application Publication No. H07-221832 and Japanese Unexamined Patent Application Publication No. 2011-130170 may be insufficient for obtaining an effect of suppressing the echo signal component, which makes it difficult to sufficiently increase the quality of a call.

Accordingly, this embodiment provides an echo cancellation device including: a voice output unit configured to output, to a space, an output voice signal in which frequency components equal to or higher than a predetermined target frequency are suppressed, as a first voice signal; a voice input unit configured to pick up a second voice signal propagating through the space and generate an acoustic signal including a frequency component higher than the target frequency; a delay processing unit configured to delay the output voice signal; a voice section detection processing unit configured to detect that the output voice signal delayed by the delay processing unit corresponds to a voice section including a voice signal component, and generate voice section information; a filter coefficient update determination unit configured to determine whether or not the acoustic signal includes an echo signal component corresponding to the output voice signal when the voice section information indicates the voice section, and enable a coefficient update signal when it is determined that the acoustic signal includes the echo signal component; and an echo signal reduction processing unit configured to update a filter coefficient for setting a degree of suppression of the echo signal component from the acoustic signal according to the coefficient update signal, and generate, from the acoustic signal, a transmitting signal in which the echo signal component is reduced. The filter coefficient update determination unit calculates a feature value of the acoustic signal and enables the coefficient update signal when a difference between a first feature value of a frequency band equal to or lower than the target frequency and a second feature value of a frequency band higher than the target frequency is equal to or greater than a preset update determination threshold.

Accordingly, this embodiment provides a non-transitory computer readable medium storing an echo cancellation program that suppresses an echo signal component corresponding to an output voice signal in an echo cancellation device, the echo cancellation device including: a voice output unit configured to output, to a space, the output voice signal in which frequency components equal to or higher than a predetermined target frequency are suppressed, as a first voice signal; a voice input unit configured to pick up a second voice signal propagating through the space and generate an acoustic signal including a frequency component higher than the target frequency; and an operation unit configured to execute a program, the echo cancellation program including: delay processing for delaying the output voice signal; voice section detection processing for detecting that the output voice signal delayed by the delay processing corresponds to a voice section including a voice signal component, and generating voice section information; echo signal reduction processing for updating a filter coefficient for setting a degree of suppression of the echo signal component from the acoustic signal, and generating, from the acoustic signal, a transmitting signal in which the echo signal component is reduced; and filter coefficient update determination processing for determining whether or not the acoustic signal includes an echo signal component corresponding to the output voice signal when the voice section information indicates the voice section, and updating the filter coefficient when it is determined that the acoustic signal includes the echo signal component. In the filter coefficient update determination processing, a feature value of the acoustic signal is calculated and an instruction to update the filter coefficient is sent when a difference between a first feature value of a frequency band equal to or lower than the target frequency and a second feature value of a frequency band higher than the target frequency is equal to or greater than a preset update determination threshold.

Accordingly, this embodiment provides an echo cancellation method that suppresses an echo signal component corresponding to an output voice signal in an echo cancellation device, the echo cancellation device including: a voice output unit configured to output, to a space, an output voice signal in which frequency components equal to or higher than a predetermined target frequency are suppressed, as a first voice signal; and a voice input unit configured to pick up a second voice signal propagating through the space and generate an acoustic signal including a frequency component higher than the target frequency, the echo cancellation method including: delaying the output voice signal; detecting that the delayed output voice signal corresponds to a voice section including a voice signal component and generating voice section information; updating a filter coefficient for setting a degree of suppression of the echo signal component from the acoustic signal, and generating, from the acoustic signal, a transmitting signal in which the echo signal component is reduced; calculating a feature value of the acoustic signal and calculating, as an echo signal determination value, a difference between a first feature value of a frequency band equal to or lower than the target frequency and a second feature value of a frequency band higher than the target frequency; and determining that the acoustic signal includes an echo signal component corresponding to the output voice signal when the voice section information indicates the voice section and the echo signal determination value is equal to or greater than a preset update determination threshold, and sending an instruction to update the filter coefficient.

According to this embodiment, an echo cancellation device, an echo cancellation program, and an echo cancellation method which provide an effect of suppressing a high echo signal are provided.

DETAILED DESCRIPTION

First Embodiment

Figure 1:
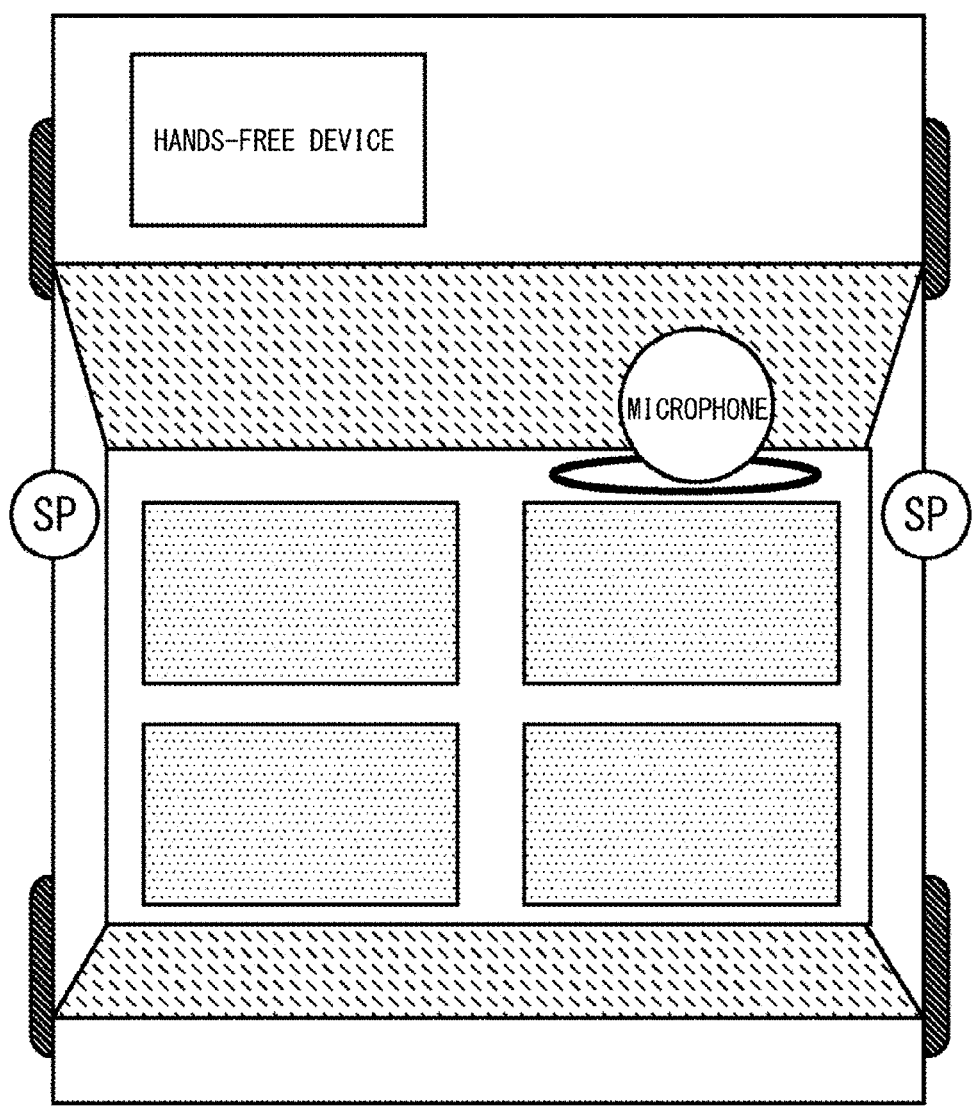
FIG. 1 is a block diagram for explaining an installation state of a hands-free device to which an echo cancellation device according to a first embodiment is applied.

Embodiments will be described below with reference to the drawings. To clarify the explanation, omissions and simplifications are made as necessary in the following description and the drawings. In the drawings, the same elements are denoted by the same reference numerals, and repeated descriptions are omitted as needed.

Functional blocks described below are configured using hardware alone, software alone, or combinations thereof, and may be configured using a piece of hardware or software, or a plurality of pieces of hardware or software. Each function (each processing) may be implemented by an operation unit (e.g., a computer) including a CPU, a memory, and the like. For example, programs for implementing a creation method in an embodiment are stored in a storage device and each function may be implemented by causing the CPU to execute the programs stored in the storage device.

These programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

FIG. 1 shows a block diagram for explaining the configuration of a hands-free device including an echo cancellation device 1 according to the first embodiment. The configuration shown in FIG. 1 is an exemplary configuration of the hands-free device. The hands-free device may have another configuration, as long as the hands-free device includes a loudspeaker and a microphone. The example shown in FIG. 1 is an example in which the hands-free device is provided in an automobile, but instead the hands-free device may be used at locations other than within an automobile.

As shown in FIG. 1, the hands-free device is provided in an automobile. The hands-free device according to the first embodiment includes a microphone provided in the body of the automobile (hereinafter referred to simply as a microphone), and a loudspeaker SP. The hands-free device according to the first embodiment uses the microphone as a voice input unit and uses the loudspeaker SP as a voice output unit.

Figure 2:
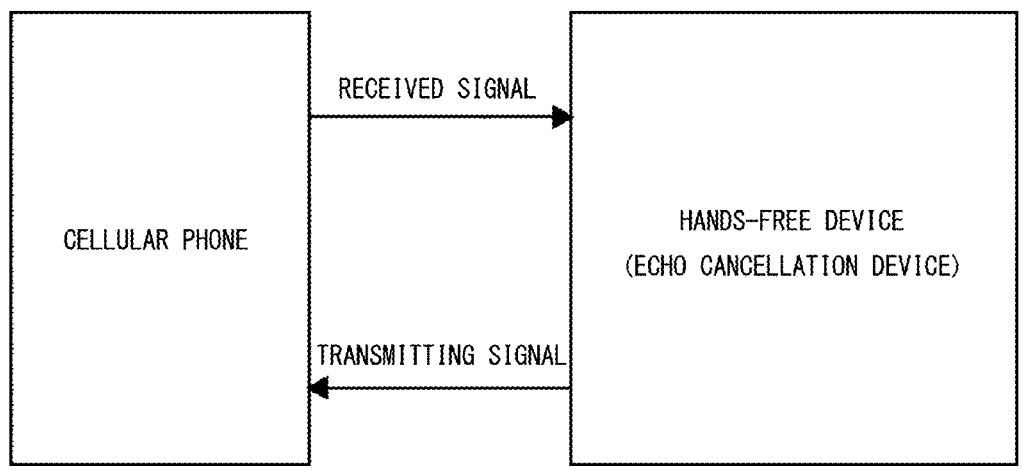
FIG. 2 is a block diagram for explaining a call system including the hands-free device to which the echo cancellation device according to the first embodiment is applied.

The hands-free device according to the first embodiment is used as a voice input/output interface, and makes a call with a call destination using a cellular phone or the like. In this regard, FIG. 2 shows a block diagram for explaining a call system including the hands-free device according to the first embodiment. As shown in FIG. 2, the hands-free device according to the first embodiment functions as a voice input interface for a cellular phone by transmitting a transmitting signal to the cellular phone and receiving a received signal from the cellular phone. Assume that the echo cancellation device 1 according to the first embodiment is provided in the hands-free device. Also assume that in the call system according to the first embodiment, the cellular phone and the echo cancellation device 1 treat voice signals at the same sampling rate. The echo cancellation device 1 according to the first embodiment will be described in detail below.

Figure 3:
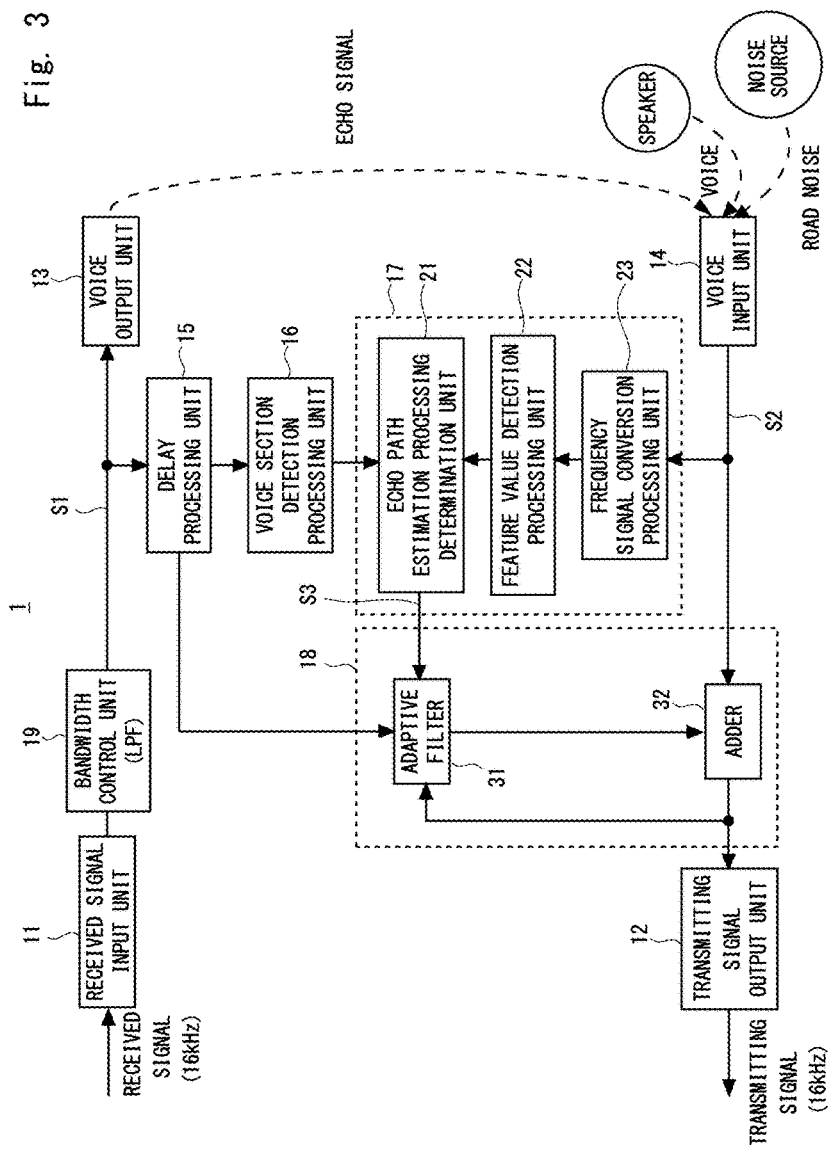
FIG. 3 is a block diagram of the echo cancellation device according to the first embodiment.

FIG. 3 shows a block diagram of the echo cancellation device 1 according to the first embodiment. In the example shown in FIG. 3, assume that the echo cancellation device 1 treats the received signal and the transmitting signal which are sampled at a sampling rate of 16 kHz.

As shown in FIG. 3, the echo cancellation device 1 according to the first embodiment includes a received signal input unit 11, a transmitting signal output unit 12, a voice output unit 13, a voice input unit 14, a delay processing unit 15, a voice section detection processing unit 16, a filter coefficient update determination unit 17, an echo signal reduction processing unit 18, and a bandwidth control unit 19.

The received signal input unit 11 receives the transmitting signal supplied from an external device, and outputs the transmitting signal to the inside of the received signal input unit. The bandwidth control unit 19 performs bandwidth control processing on the transmitting signal supplied from the received signal input unit 11 and outputs an output voice signal. The bandwidth control unit 19 is, for example, a lowpass filter, and controls a frequency band equal to or higher than a target frequency of the received signal and generates the output voice signal. Assume herein that the target frequency is set in advance.

The voice output unit 13 outputs, to a space, an output voice signal S1, which is output from the bandwidth control unit 19, as a first voice signal. The bandwidth of the output voice signal S1 output from the voice output unit 13 is controlled so that the output voice signal includes a frequency component equal to or lower than the target frequency. The first voice signal (for example, an echo signal shown in FIG. 3) is in a state where voice components equal to or higher than the target frequency are suppressed.

The voice input unit 14 picks up a second voice signal propagating through the space, and generates an acoustic signal S2 including a frequency component higher than the target frequency. In this case, the second voice signal includes a voice component emitted from a speaker, road noise emitted from a noise source, and an echo signal component output as the first voice signal.

The transmitting signal output unit 12 outputs, to the cellular phone, the transmitting signal generated after the echo cancellation processing is performed on the acoustic signal S2 in the echo signal reduction processing unit 18.

The delay processing unit 15 delays the output voice signal S1 and provides the voice section detection processing unit 16 with the delayed signal. In this case, the amount of delay of the output voice signal S1 that is delayed by the delay processing unit 15 is a time corresponding to a total delay time when the first voice signal which is output from the voice output unit 13 and is changed through a space propagation coefficient of a cabin space into an echo signal is picked up as a signal included in the second voice signal.

The voice section detection processing unit 16 detects that the output voice signal S1 delayed by the delay processing unit 15 corresponds to a voice section including a voice signal component, and generates voice section information. This voice section information is supplied to the filter coefficient update determination unit 17. In this case, the voice section detection processing unit 16 confirms whether or not a signal having an amplitude level exceeding a preset threshold is present in a certain time interval in the output voice signal S1, thereby detecting the presence or absence of a voice section. For example, in a case where the time interval is set to 5 msec and the threshold is set to −24 dB, the absolute value of the amplitude level of the output voice signal S1 which is delayed by the delay processing unit 15 is confirmed. When an amplitude level exceeding −24 dB is detected, it is determined that the output voice signal corresponds to the voice section, and when the amplitude level is lower than −24 dB, it is determined that the output voice signal does not correspond to the voice section.

When the voice section information indicates the voice section, the filter coefficient update determination unit 17 determines whether or not the acoustic signal includes an echo signal component corresponding to the output voice signal S1. When it is determined that the acoustic signal includes the echo signal component, a coefficient update signal S3 is enabled. In this case, the filter coefficient update determination unit 17 calculates a feature value of the acoustic signal, and when a difference between a first feature value of a frequency band equal to or lower than the target frequency and a second feature value of a frequency band higher than the target frequency is equal to or greater than a preset update determination threshold, the filter coefficient update determination unit 17 enables the coefficient update signal S3.

The filter coefficient update determination unit 17 includes an echo path estimation processing determination unit 21, a feature value detection processing unit 22, and a frequency signal conversion processing unit 23. The frequency signal conversion processing unit 23 converts the acoustic signal S2 into a frequency signal. More specifically, the frequency signal conversion processing unit 23 converts the acoustic signal S2 from a time domain signal to a frequency domain signal by FFT (Fast Fourier Transform) or DCT (discrete cosine transform). Further, the frequency signal conversion processing unit 23 converts the acoustic signal S2 into a frequency signal at a sampling rate (for example, 16 kHz) at which a voice of a frequency band higher than the target frequency can be recorded.

For example, when the sampling rate is 16 kHz and the number of samples for frequency signal conversion processing to 1024 samples, the frequency signal conversion processing unit 23 obtains a frequency resolution of 15.625 Hz by Formula (1).

[Formula 1]

$$\text{frequency resolution} = \frac{\text{sampling rate}}{\text{number of samples}} [\text{Hz}] \quad (1)$$

In this case, a period of a frequency conversion cycle is calculated as 0.032 sec by Formula (2).

[Formula 2]

$$\text{frequency conversion cycle} = \left(\frac{1}{\text{sampling rate}}\right) \times \left(\frac{\text{number of samples}}{2}\right)[\text{sec}] \quad (2)$$

The feature value detection processing unit 22 calculates the first feature value and the second feature value from the frequency signal obtained through the conversion by the frequency conversion processing unit. More specifically, the feature value detection processing unit 22 detects the feature value of a spectrum from the spectrum signal of the acoustic signal S2 which is converted into a frequency domain signal. As a method for detecting the feature value of the echo spectrum, a spectrum intensity in a wide frequency band of the acoustic signal S2 is detected. A specific detection method is described later.

Further, the feature value detection processing unit 22 also detects a speaker spectrum signal obtained from a speaker's voice in the cabin of the automobile. Examples of the method for detecting the feature value of the speaker spectrum include a method of monitoring a time change of the spectrum intensity in the frequency band which is equal to or higher than the target frequency and in which the voice spectrum intensity can be detected.

The echo path estimation processing determination unit 21 determines whether or not to execute echo path estimation processing by using the voice section information output from the voice section detection processing unit 16 and spectrum feature value detection information output from the feature value detection processing unit 22. More specifically, when the voice section information indicates the voice section and the difference between the first feature value and the second feature value is equal to or greater than the preset update determination threshold, the coefficient update signal S3 is enabled. As the spectrum feature value detection information output from the feature value detection processing unit 22, the spectrum feature value detection information of the target frequency band calculated by the feature value detection processing unit 22 when the voice section information indicates the voice section is used by using the voice section information so as to prevent an erroneous detection due to the effect of noise in the cabin of the automobile. When it is determined that the spectrum feature value detection information of the target frequency band exceeds the threshold, it is determined that the echo signal is included in the acoustic signal, and a notification is sent to an adaptive filter unit 31 of the echo signal reduction processing unit 18 to execute the echo path estimation processing. However, if the echo estimation processing is executed when the echo signal is included in the acoustic signal and the speaker speaks in the cabin of the automobile, that is, in a so-called double-talk state, an error occurs in updating of the adaptive filter coefficient, which leads to deterioration in the effect of echo cancellation. Therefore, in the double-talk state, a notification is sent to the adaptive filter unit 21 so as to prevent the adaptive filter unit from executing the echo estimation processing.

The echo signal reduction processing unit 18 updates the filter coefficient for setting the degree of suppression of the echo signal component corresponding to the output voice signal from the acoustic signal S2 according to the coefficient update signal S2, and generates, from the acoustic signal S2, the transmitting signal in which the echo signal component is reduced. The echo signal reduction processing unit 18 includes the adaptive filter unit 31 and an adder 32.

The adaptive filter unit 31 updates the filter coefficient according to the coefficient update signal S3, and generates a pseudo echo signal based on the output voice signal S1 delayed by the delay processing unit delay processing unit 15 and the transmitting signal output from the addition unit 32. The adaptive filter unit 31 may have a filter length of about 300 Taps in, for example, an LMS (Least Mean Square) algorithm. In the adaptive filter unit 31, the output voice signal S1 delayed by the delay processing unit 15 is used as a reference signal. Further, in the adaptive filter unit 31, a residual echo signal, which is obtained after addition processing is performed by the adder 32, is used as an error signal. The adaptive filter unit 31 updates the coefficient of the adaptive filter when the echo path estimation processing determination unit 21 makes a determination to execute the echo path estimation processing (for example, when the coefficient update signal S3 is enabled).

The adder 32 subtracts the pseudo echo signal component output from the adaptive filter unit 31 from the acoustic signal S2 and outputs the transmitting signal.

Next, an operation of the echo cancellation device 1 according to the first embodiment will be described. In the following description, in particular, the echo cancellation processing in the echo cancellation device 1 will be described. In this regard, FIG. 4 shows a flowchart for explaining an operation of the echo cancellation device 1 according to the first embodiment.

Figure 4:
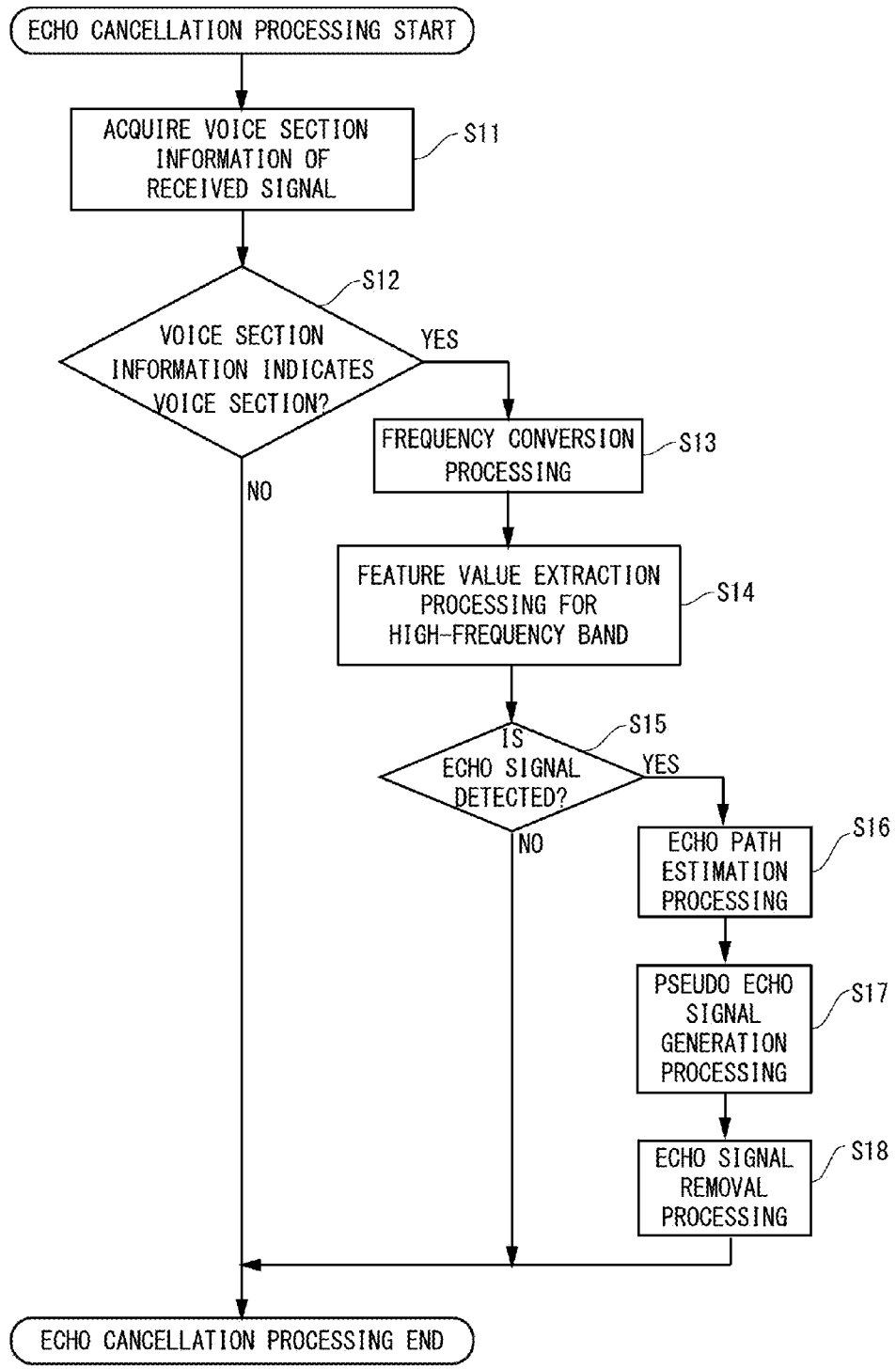
FIG. 4 is a flowchart for explaining an operation of the echo cancellation device according to the first embodiment.

As shown in FIG. 4, when the echo cancellation device 1 according to the first embodiment starts the echo cancellation processing, the filter coefficient update determination unit 17 first acquires the voice section information of the output voice signal S1 (step S11). Further, the filter coefficient update determination unit 17 determines whether or not the output voice signal S1 includes a voice signal (step S12). In this step S12, when it is determined that the voice section information indicates a non-voice section (a branch of NO in step S12), the acoustic signal S2 does not include the echo component. Accordingly, the echo cancellation device 1 terminates the echo cancellation processing without executing the echo cancellation processing.

On the other hand, in step S12, when it is determined that the voice section information indicates the voice section (a branch of YES in step S12), the frequency signal conversion processing unit 23 performs the frequency signal conversion processing on the acoustic signal S2 (step S13). After that, the feature value detection processing unit 22 performs feature value extraction processing in a high-frequency band (step S14). Further, the echo path estimation processing determination unit 21 performs processing for detecting the presence or absence of the echo signal (step S15).

In the echo signal detection processing in step S15, when the echo signal is not detected (a branch of NO in step S15), the echo cancellation device 1 terminates the echo cancellation processing without executing the echo cancellation processing. On the other hand, in the echo signal detection processing in step S15, when the echo signal is detected (a branch of YES in step S15), the adaptive filter unit 31 performs the echo path estimation processing (step S16), and also performs pseudo echo signal generation processing (step S17). Further, the adder 32 performs echo signal removal processing (step S18).

Figure 5:
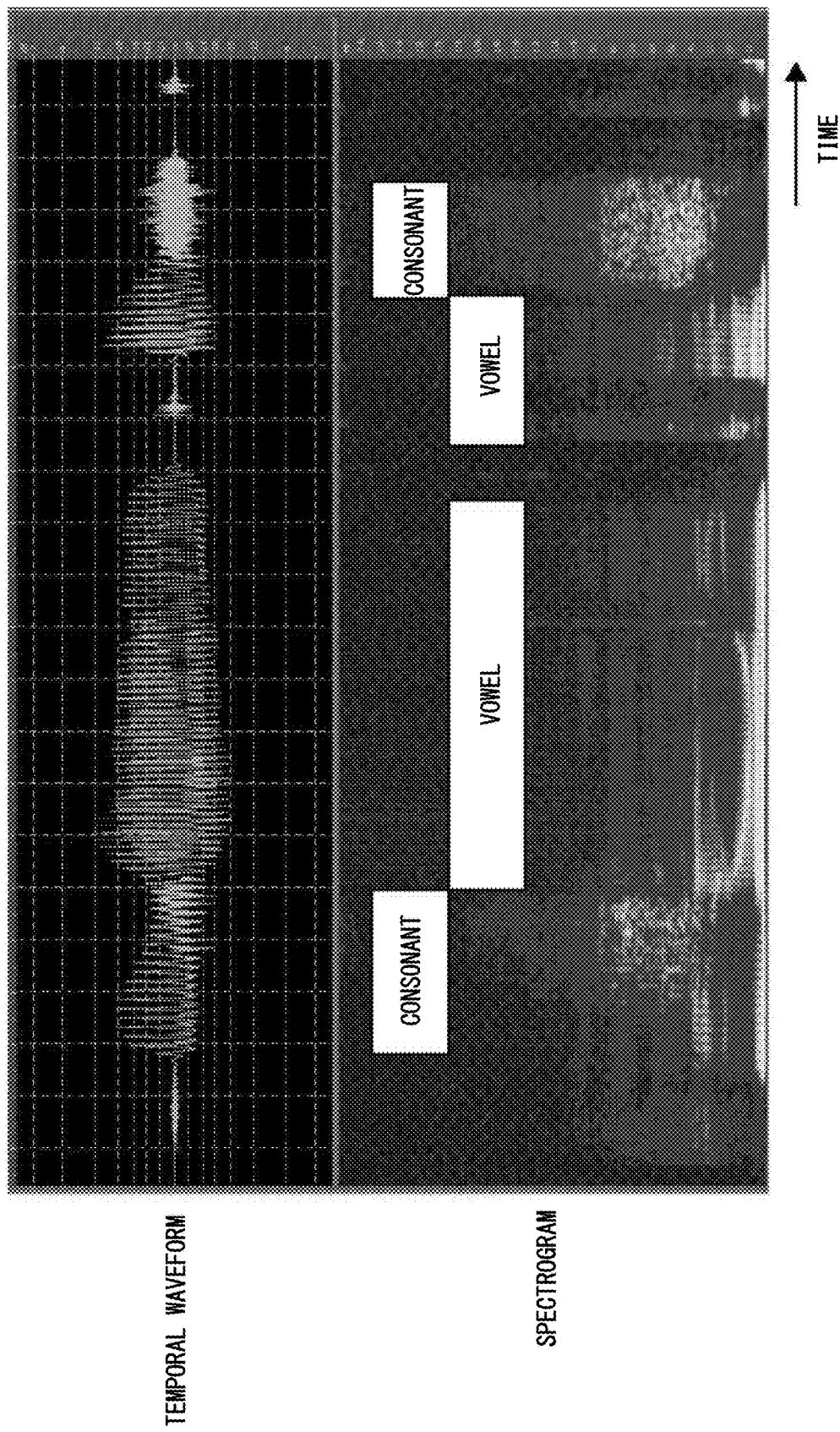
FIG. 5 is a graph for explaining features of a voice signal treated by the echo cancellation device according to the first embodiment.

The feature value extraction processing in step S14 and step S15 will be described in more detail by providing a specific example of the acoustic signal S2. FIG. 5 shows a graph for explaining features of a voice signal input as the acoustic signal S2. The example of FIG. 5 shows a waveform of a voice signal obtained by recording only a voice in a quiet room. In FIG. 5, an upper graph shows a time signal waveform of the voice signal, and a lower graph shows a spectrogram of the voice signal. Note that in FIG. 5, in the (upper) graph showing the temporal waveform, the horizontal axis represents time and the vertical axis represents an amplitude, and in the (lower) graph showing the spectrogram, the horizontal axis represents time; the vertical axis represents a frequency; and the spectrum intensity of the signal is represented by grayscale.

As shown in FIG. 5, in the voice spectrum, the frequency band indicating a high spectrum intensity of a consonant is different from that of a vowel. The spectrum intensity of a vowel tends to be high in a range of 10 to 4000 Hz, and tends to be low in a range of 4000 Hz to 8000 Hz. The spectrum intensity of a consonant tends to be high in a range of 3000 Hz to 9000 Hz, and tends to be low in a range of 9000 Hz to 15000 Hz.

Figure 6:
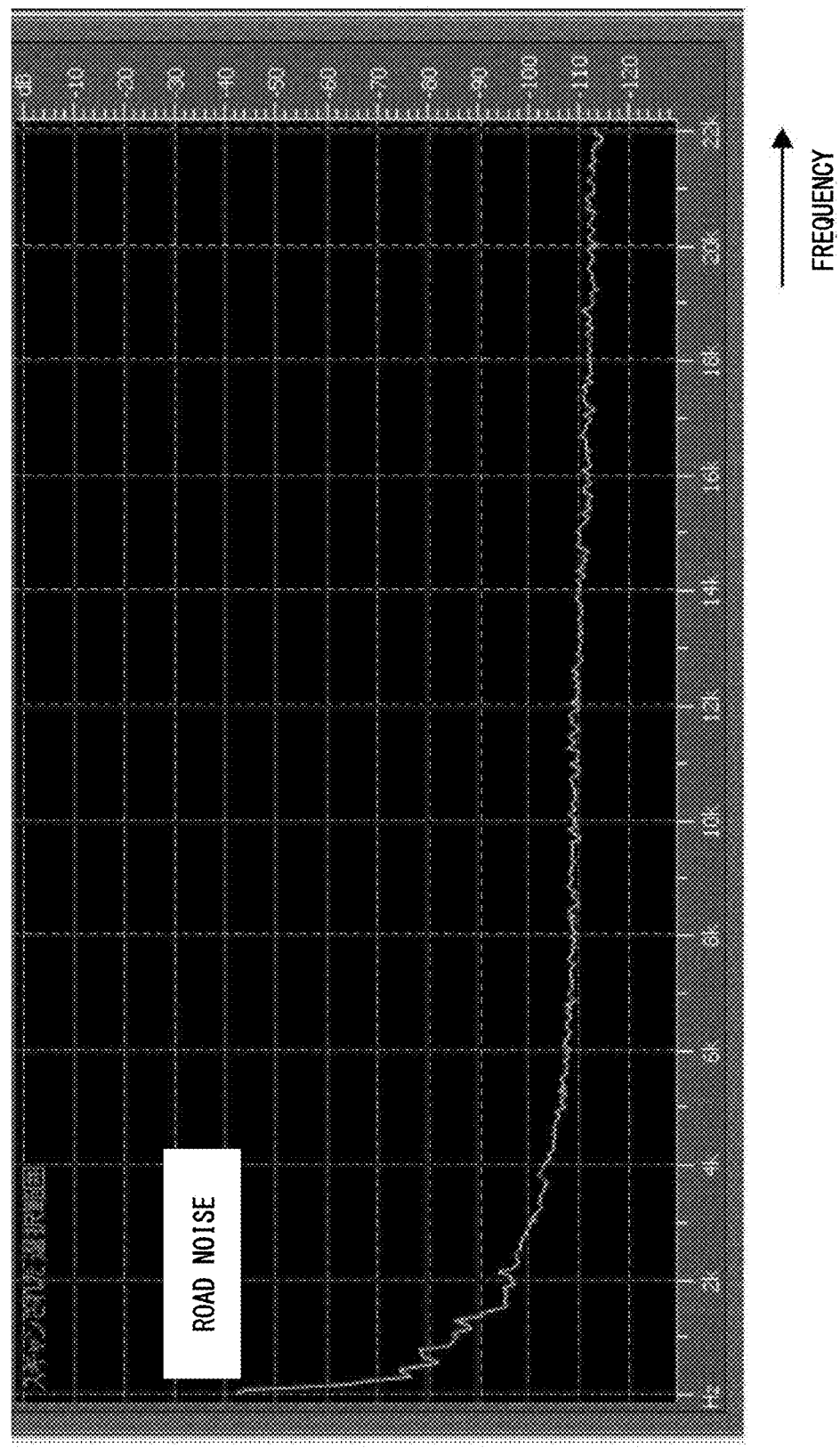
FIG. 6 is a graph for explaining features of a noise signal input to the echo cancellation device according to the first embodiment.

FIG. 6 shows a graph for explaining features of a noise signal input to the echo cancellation device 1 according to the first embodiment. The graph of FIG. 6 shows a spectrum signal of road noise picked up in the automobile traveling on an expressway. In the graph of FIG. 6, the horizontal axis represents a frequency and the vertical axis represents the signal intensity of road noise.

As shown in FIG. 6, the road noise has a strong spectrum in a range of 20 to 1500 Hz. In particular, the road noise has an extremely strong spectrum in a low frequency range of 500 Hz or lower. In other words, the road noise has little effect on the voice signal in a frequency band of 2000 Hz or higher.

Figure 7:
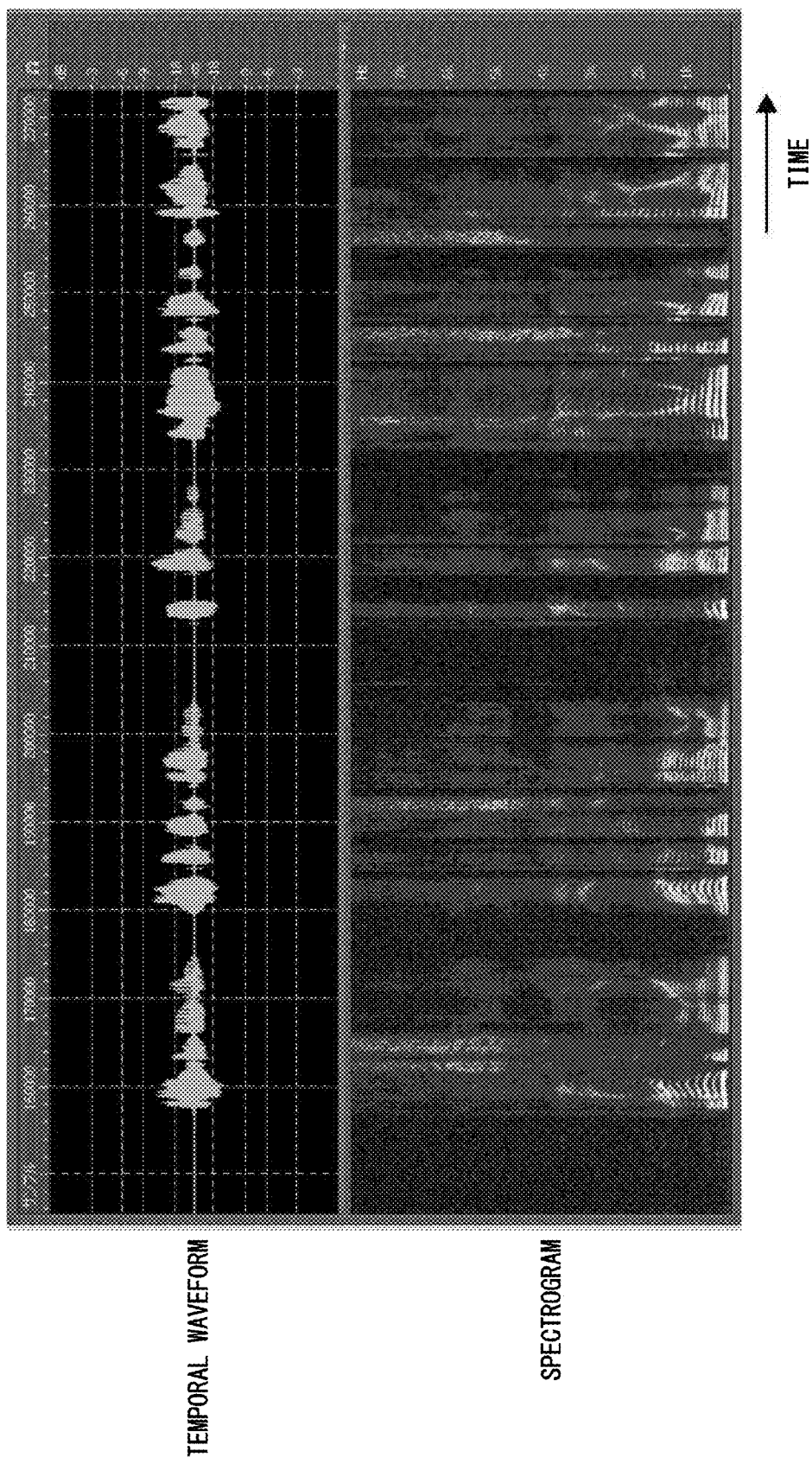
FIG. 7 is a graph for explaining a temporal waveform and a spectrogram of the voice signal treated by the echo cancellation device according to the first embodiment.
Figure 8:
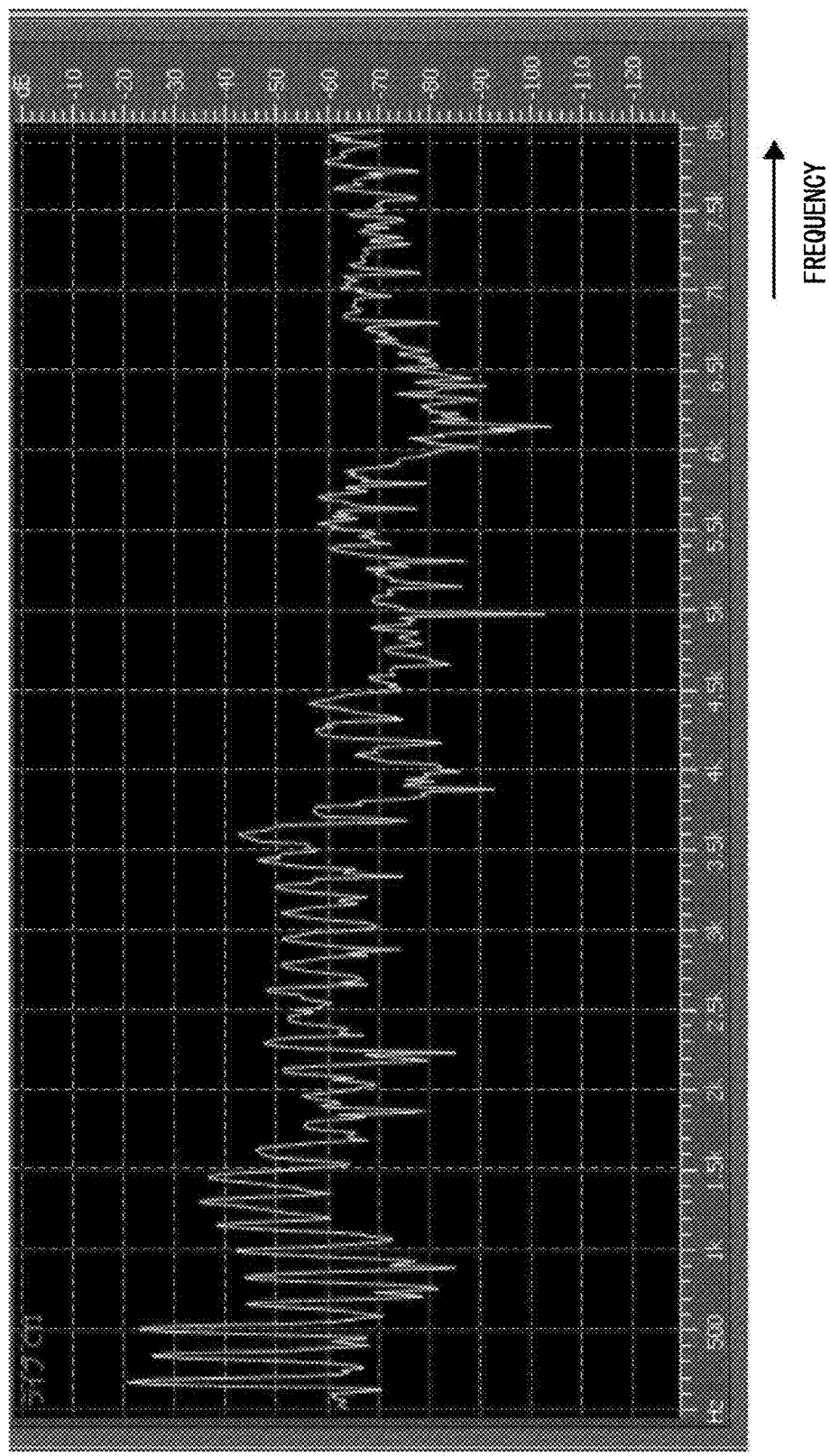
FIG. 8 is a graph for explaining a spectrum of the voice signal treated by the echo cancellation device according to the first embodiment.

Next, FIG. 7 shows a graph for explaining a temporal waveform and a spectrogram of the voice signal treated by the echo cancellation device 1 according to the first embodiment. FIG. 8 shows a graph for explaining a spectrum of the voice signal treated by the echo cancellation device according to the first embodiment. The examples of FIGS. 7 and 8 show the voice signal which has a waveform obtained with a sampling rate of 16 kHz and on which the bandwidth control processing is not performed by the bandwidth control unit 19. As shown in FIGS. 7 and 8, when the sampling rate is 16 kHz, the reproduction frequency band of the voice signal is up to about 8 kHz.

Figure 9:
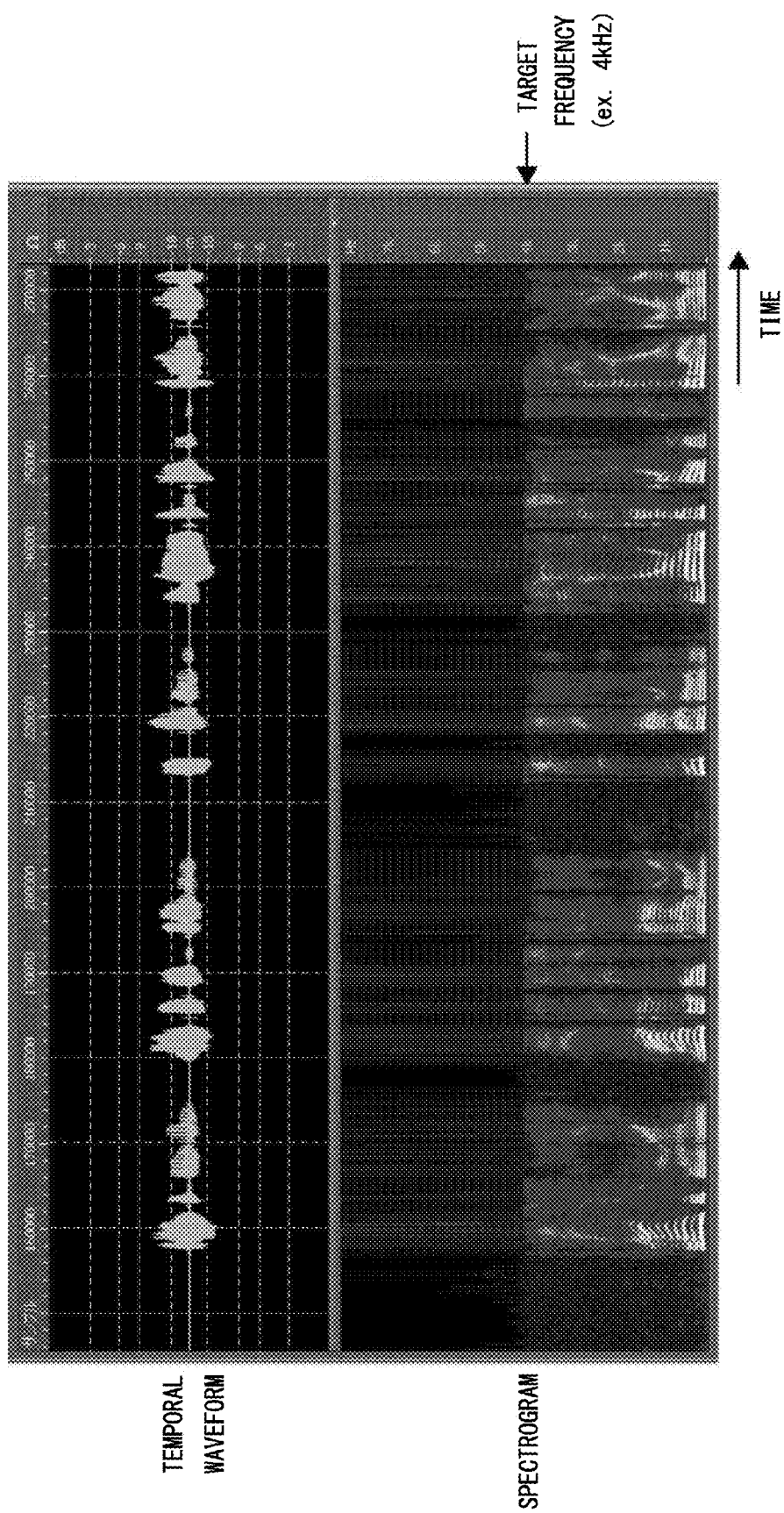
FIG. 9 is a graph for explaining a temporal waveform and a spectrogram when a bandwidth control is performed on the voice signal treated by the echo cancellation device according to the first embodiment.
Figure 10:
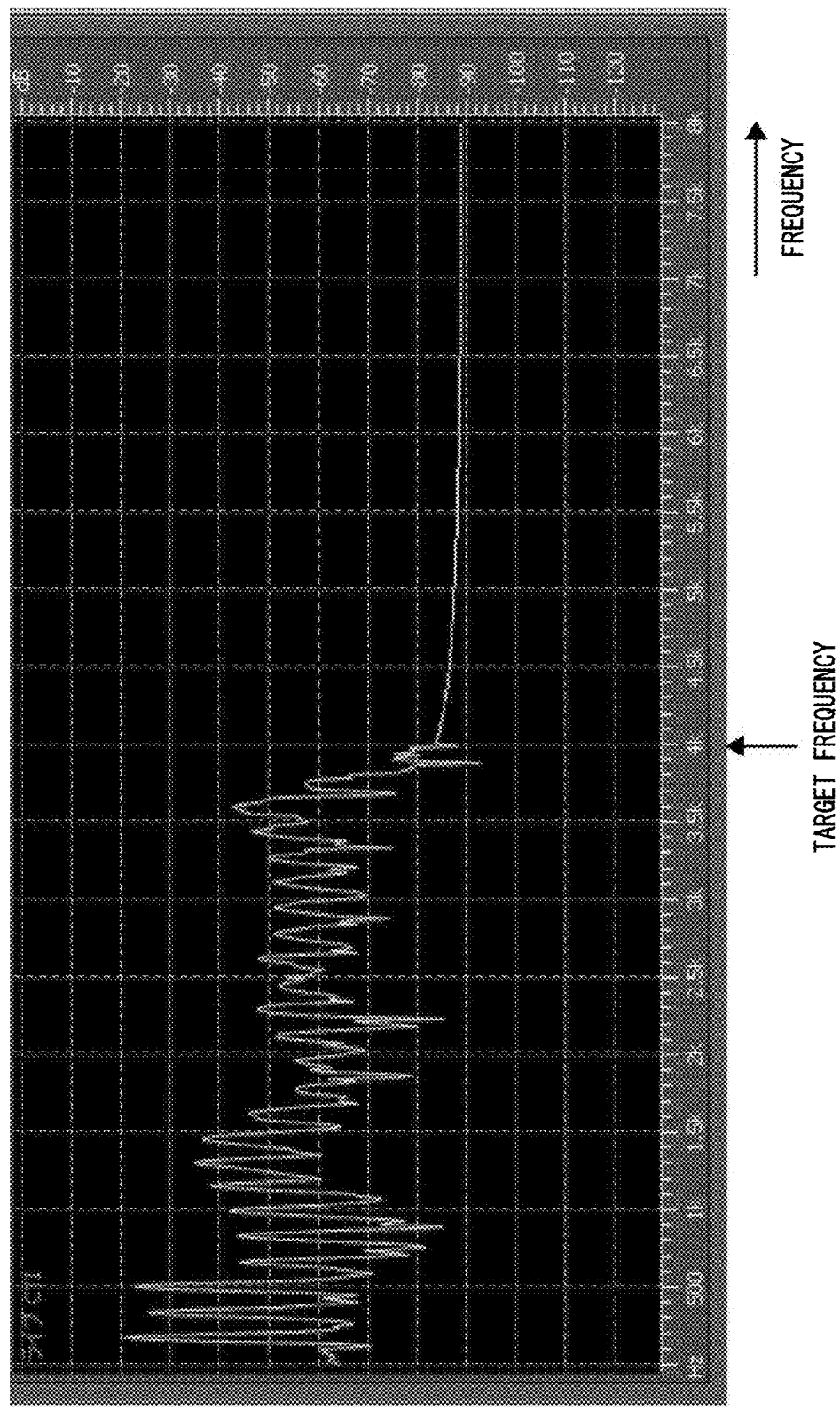
FIG. 10 is a graph for explaining a spectrum when a bandwidth control is performed on the voice signal treated by the echo cancellation device according to the first embodiment.

FIGS. 9 and 10 show graphs for explaining features of a voice signal when the bandwidth control processing is performed on the voice signal shown in FIGS. 7 and 8. In the examples shown in FIGS. 9 and 10, the target frequency is set to 4 kHz and the bandwidth control unit 19 attenuates signal components in a frequency band of 4 kHz or higher. As shown in FIGS. 9 and 10, when the bandwidth control using the target frequency (for example, 4 kHz) as an upper limit is performed, almost all the voice components in the frequency band equal to or higher than the target frequency are removed.

In the echo cancellation device 1 according to the first embodiment, the voice input unit 14 and the frequency signal conversion processing unit 23 which are capable of acquiring the acoustic signal S2 having the features shown in FIGS. 7 and 8 acquire the acoustic signal S2 including the echo signal having the features shown in FIGS. 9 and 10. Further, the echo cancellation device 1 according to the first embodiment determines whether or not the echo signal is present based on the acoustic signal S2 including the echo signal having the features shown in FIGS. 9 and 10. In this regard, the processing in the feature value detection processing unit 22 and the echo path estimation processing determination unit 21 will be described by providing a specific example of numerical values.

First, when the voice input unit 14 generates the acoustic signal S2 at a sampling rate of 16 kHz, and the frequency signal conversion processing unit 23 performs frequency conversion processing with the number of samples of 1024 samples and at a frequency resolution of 15.625 Hz. When the target frequency at which the bandwidth of the output voice signal S1 is controlled is set to 4 kHz, the frequency signal corresponding to the target frequency is the 256th spectrum signal. Accordingly, the feature value detection processing unit 22 calculates, as the first feature value, the average value of the intensities of the 240th to 256th spectrum signals which are frequency signals of 3750 Hz. Further, the feature value detection processing unit 22 calculates, as the second feature value, the average value of the intensities of the 256th to 262th spectrum signals. The 272th spectrum signal is a frequency signal of 4250 Hz. In the feature value detection processing of step S14, the feature value detection processing unit 22 calculates the feature values described above.

Further, in the echo signal detection processing of step S15, the echo path estimation processing determination unit 21 determines whether or not the echo signal is present on the basis of whether or not the difference between the first feature value and the second feature value exceeds the preset update determination threshold (for example, 12 dB). Specifically, when the difference between the first feature value and the second feature value is smaller than the update determination threshold, it is determined that the echo signal is not present and the echo path estimation processing determination unit 21 disables the coefficient update signal S3. When the difference between the first feature value and the second feature value is equal to or greater than the update determination threshold, it is determined that the echo signal is present and the echo path estimation processing determination unit 21 enables the coefficient update signal S3.

In this case, the echo path estimation processing determination unit 21 according to the first embodiment calculates the feature value of the acoustic signal S2 and detects the speaker spectrum signal obtained from a voice emitted from the speaker. A method for detecting the speaker spectrum signal will be described below.

For example, when the sampling rate of the hands-free communication device 1 is set to 16 kHz; the target frequency is set to 4 kHz; and the frame size for frequency conversion processing is set to 1024 samples, the frequency resolution is 15.625 Hz; a time per frame is 32 msec; and the frequency that can be picked up by the microphone is 8 kHz. In the spectrum signal, the spectrum signal corresponding to the target frequency of 4 kHz is the 256th spectrum signal. In the detection of the speaker spectrum signal, the feature value detection processing unit 22 calculates the spectrum intensities of 256 spectrum signals, i.e., the 256th to 512th spectrum signals, assuming that the upper limit of the voice bandwidth is the maximum frequency of 8 kHz of the 512th signal. The echo path estimation processing determination unit 21 compares the spectrum intensity of the speaker spectrum signal in the present frame with that in the previous frame, thereby detecting the voice section of the speaker. When the present frame corresponds to the voice section, the echo path estimation processing determination unit 21 maintains the coefficient update signal S3 in the disabled state, thereby interrupting updating of the filter coefficient of the adaptive filter unit 31.

In the case of a system in which the sampling rate of the hands-free communication device 1 sufficiently exceeds the frequency band of a human voice, an upper limit to a frequency band to be detected may be set. For example, when the sampling rate of the hands-free communication device 1 is 64 kHz; the target frequency is 4 kHz; and the frame size for frequency conversion processing is 4096 samples, the frequency resolution is 15.625 Hz; a time per frame is 32 msec; and the frequency that can be picked up by the microphone is 32 kHz. The spectrum signal corresponding to the target frequency of 4 kHz is the 256th spectrum signal. In this case, the upper limit of the voice bandwidth detected by the feature value detection processing unit 22 is 10 kHz of the 640th signal. Further, the feature value detection processing unit 22 calculates the intensities of 384 spectrum signals, i.e., the 256th to 640th spectrum signals. The echo path estimation processing determination unit 21 compares the spectrum intensity in the present frame with the spectrum intensity in the previous frame, thereby detecting the voice section of the speaker.

In order to compare the spectrum intensities, it is determined whether the spectrum in the present frame exceeds a certain threshold (for example, 12 dB) with respect to the spectrum in the previous frame. Further, it is determined whether there is a speaker's voice in the cabin of the automobile on the basis of whether or not the number of spectrum signals exceeding the threshold exceeds a certain threshold (for example, 100 [signals]). The spectrum signal in the previous frame can be updated by the following Formula (3). Note that in Formula (3), i represents the spectrum number.

[Formula 3]

$$\text{Previous spectrum}[i] = (\text{previous spectrum}[i] \times 0.99) + (\text{present spectrum}[i] \times 0.01) \quad (3)$$

As described above, the echo cancellation device 1 according to the first embodiment outputs the output voice signal S1 whose bandwidth is controlled with the target frequency lower than the frequency band that can be picked up, and compares the first feature value of the acoustic signal S2 having the predetermined frequency band equal to or lower than the target frequency of the acoustic signal S2 generated from the collected voice with the second feature value of the acoustic signal S2 having the predetermined frequency band higher than the target frequency, thereby detecting the presence or absence of the echo signal. Thus, the echo cancellation device 1 according to the first embodiment can detect the presence or absence of the echo signal with high accuracy.

The echo cancellation device according to the first embodiment limits the frequency band of the spectrum signal used for calculation of the first feature value and the second feature value to the vicinity of the target frequency. Consequently, the echo cancellation device 1 according to the first embodiment can reduce the amount of memory used for detecting the echo signal. By limiting the frequency band of the spectrum signal used for calculation of the first feature value and the second feature value to the vicinity of the target frequency, the echo cancellation device 1 according to the first embodiment can detect the presence or absence of the echo signal without being affected by road noise or the like.

Furthermore, the echo cancellation device 1 according to the first embodiment calculates the first feature value and the second feature value and detects whether or not the spectrum signal of the acoustic signal S2 having a frequency band higher than the target frequency includes the speaker spectrum of a voice emitted from the speaker. When the echo cancellation device 1 according to the first embodiment determines that the acoustic signal S2 corresponds to the voice section including the speaker spectrum, the echo cancellation device 1 interrupts updating of the filter coefficient of the adaptive filter unit 31. Thus, the echo cancellation device 1 according to the first embodiment can prevent erroneous updating of the filter coefficient due to a voice emitted from the speaker and enhance the effect of echo cancellation.

Second Embodiment

Figure 11:
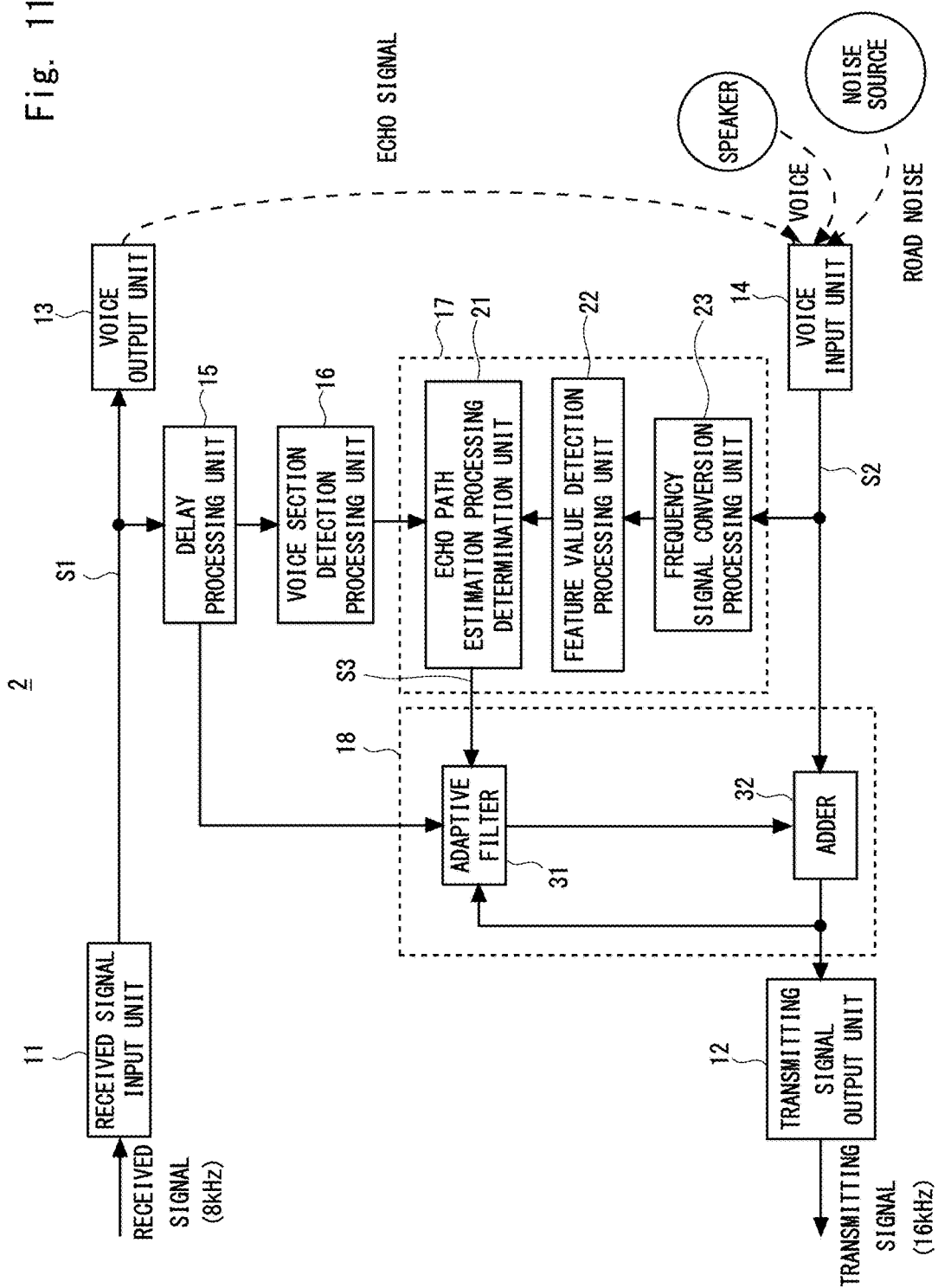
FIG. 11 is a block diagram of an echo cancellation device according to a second embodiment.

In a second embodiment, another mode of the method for controlling the frequency band of the output voice signal S1 will be described. In this regard, FIG. 11 shows a block diagram of an echo cancellation device 2 according to the second embodiment. As shown in FIG. 11, the echo cancellation device 2 according to the second embodiment has a configuration in which the bandwidth control unit 19 is omitted from the configuration of the echo cancellation device 1 according to the first embodiment.

The echo cancellation device 2 according to the second embodiment generates the acoustic signal S2 at a sampling rate higher than that of the received signal received from a cellular phone or the like, and generates a transmitting signal from the acoustic signal S2. Thus, the echo cancellation device 2 according to the second embodiment controls the frequency band of the output voice signal S1 to be lower than the frequency band of the acoustic signal S2.

Specifically, for example, when the sampling rate of the received signal is 8 kHz, the frequency band of the output voice signal S1 is controlled to 4 kHz. On the other hand, when the sampling rate of the acoustic signal S2 is 16 kHz, the frequency band of the acoustic signal S2 is 8 kHz. Accordingly, in the second embodiment, the signal characteristic of the echo signal generated from the output voice signal S1 can be set to be the same as the signal characteristic of the signal whose frequency band is controlled as shown in FIGS. 9 and 10, and the signal characteristic of the acoustic signal S2 can be set to be the same as the signal characteristic of the signal whose bandwidth is not controlled as shown in FIGS. 7 and 8. In other words, in the echo cancellation device 2 according to the second embodiment, the echo cancellation device 2 is operated at a sampling rate higher than the sampling rate of the transmitting signal, thereby making it possible to carry out the detection of the echo signal and the echo cancellation processing that are similar to those of the echo cancellation device 1 according to the first embodiment.

Note that a human voice signal has a feature that the basic frequency of the voice signal has a strong spectrum of about 100 to 250 Hz, although it varies from person to person and between men and women, and the spectrum intensity gradually decreases as the frequency band increases two-fold, three-fold, four-fold, . . . , and n-fold according to the harmonic structure based on the basic frequency. In the human voice signal, a spectrum signal is present in about 10 to 12 kHz.

As described above, the echo cancellation device 2 according to the second embodiment can carry out the detection of the echo signal and the echo cancellation processing that are similar to those of the echo cancellation device 1 according to the first embodiment, without using the bandwidth control unit 19.

Third Embodiment

A third embodiment illustrates an example in which residual echo cancellation processing for removing residual echo signal components remaining in the transmitting signal after echo cancellation processing is performed once is added to the processing of the echo cancellation device 1 according to the first embodiment. First, the residual echo signal components will be described.

Figure 12:
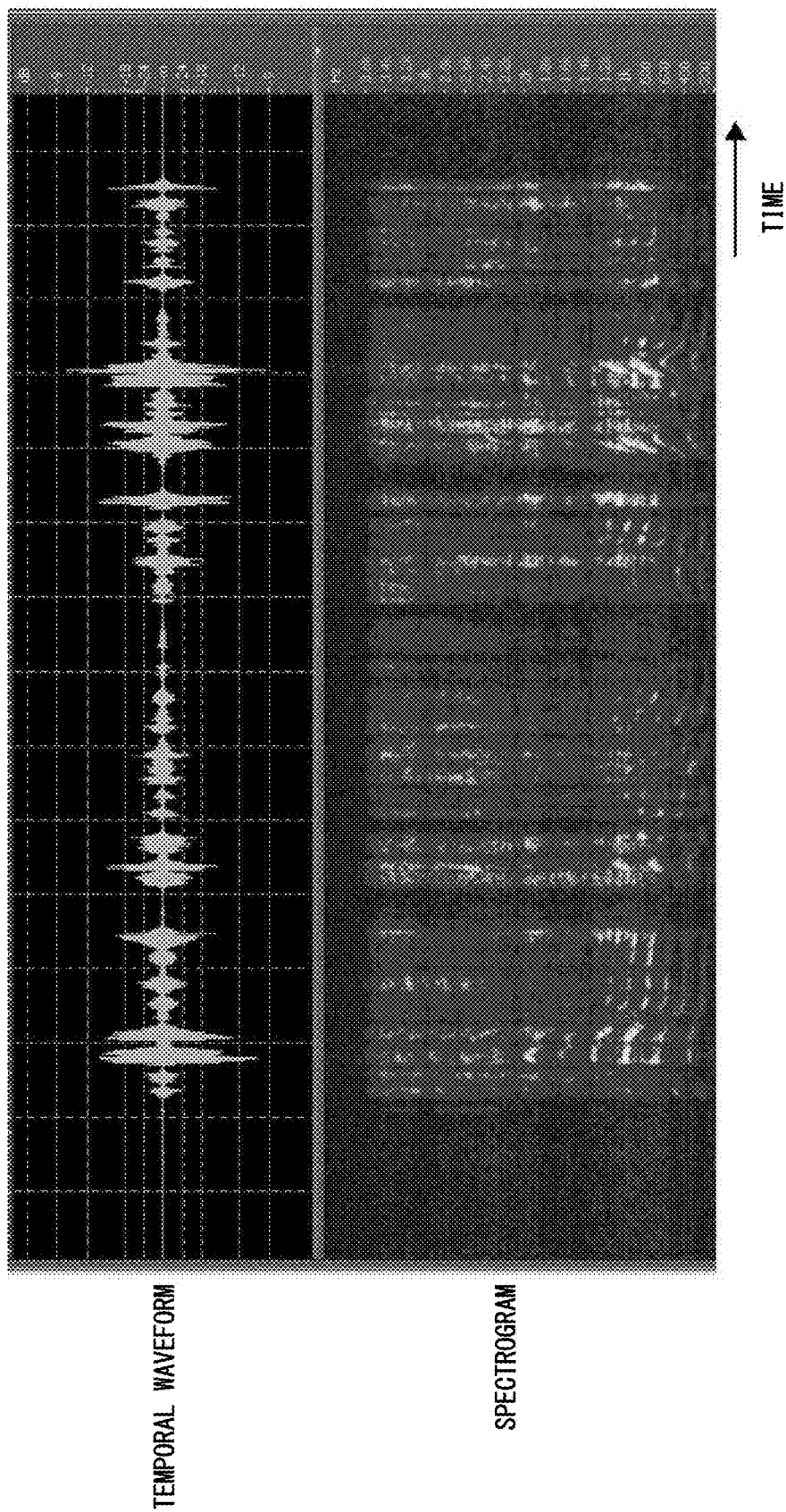
FIG. 12 is a graph for explaining a temporal waveform and a spectrogram of a voice signal on which echo cancellation processing is not performed by the echo cancellation device.
Figure 13:
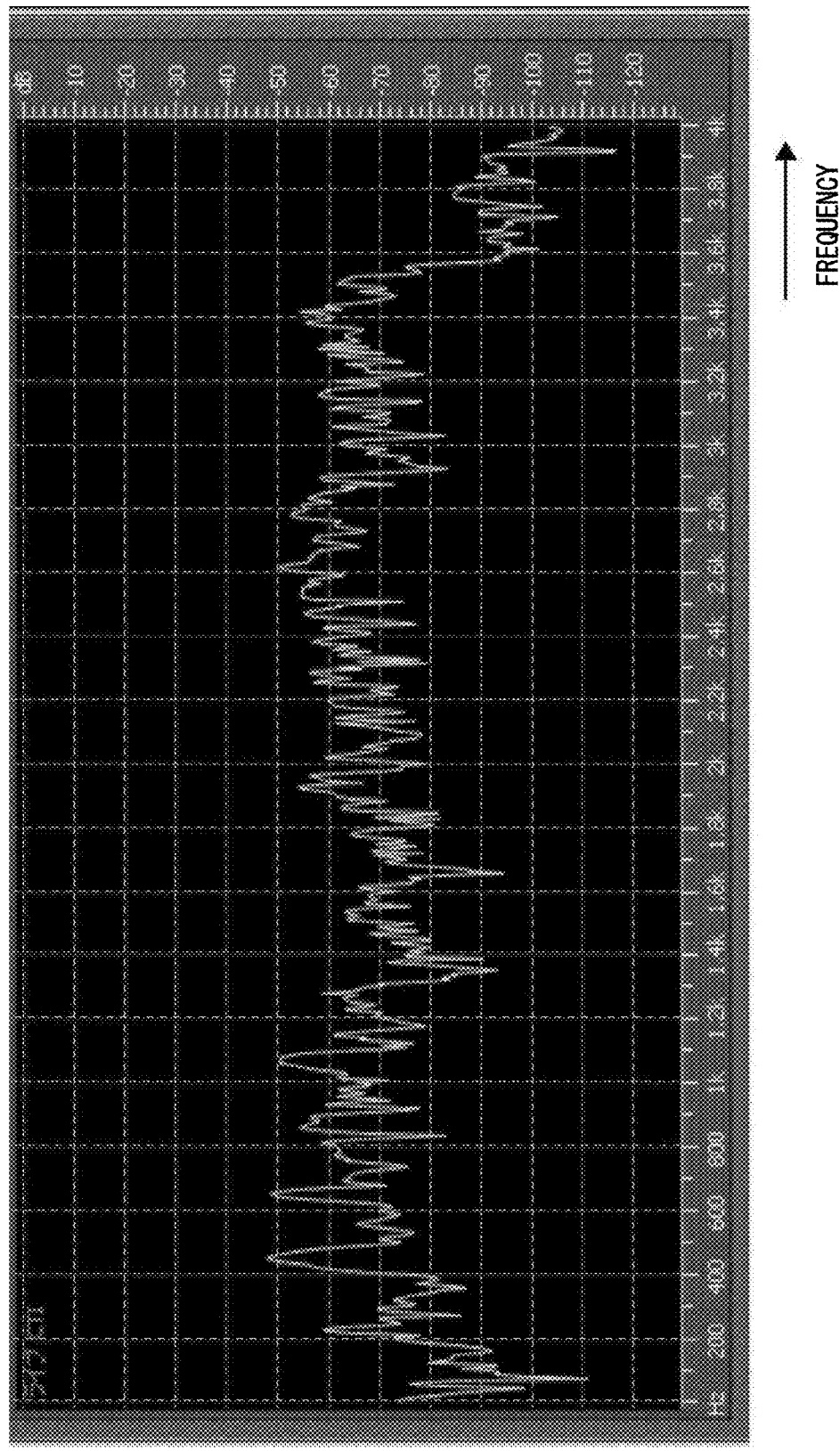
FIG. 13 is a graph for explaining a spectrum of the voice signal on which the echo cancellation processing is not performed by the echo cancellation device.
Figure 14:
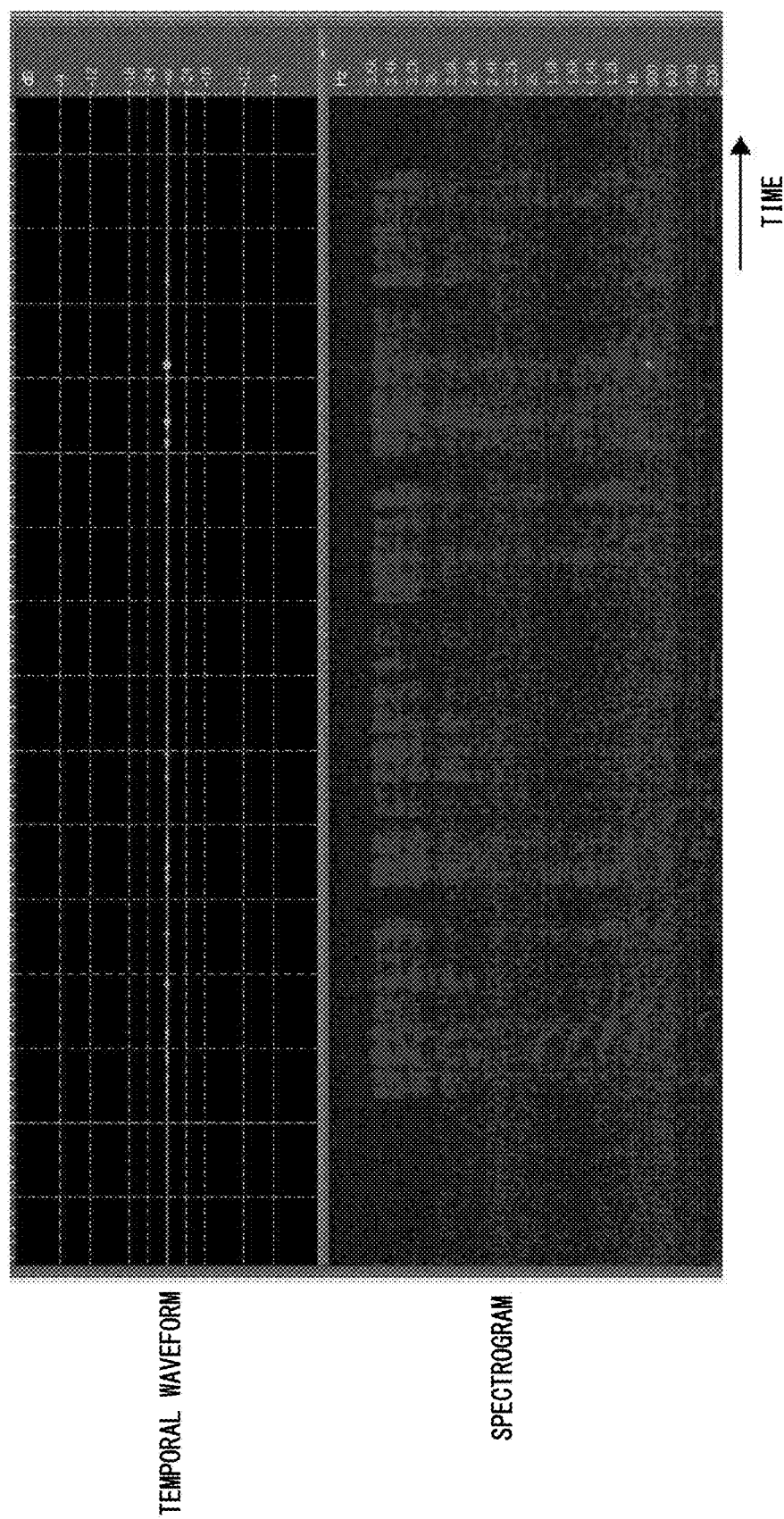
FIG. 14 is a graph for explaining a temporal waveform and a spectrogram of a residual echo signal component of a voice signal on which the echo cancellation processing is performed by the echo cancellation device.
Figure 15:
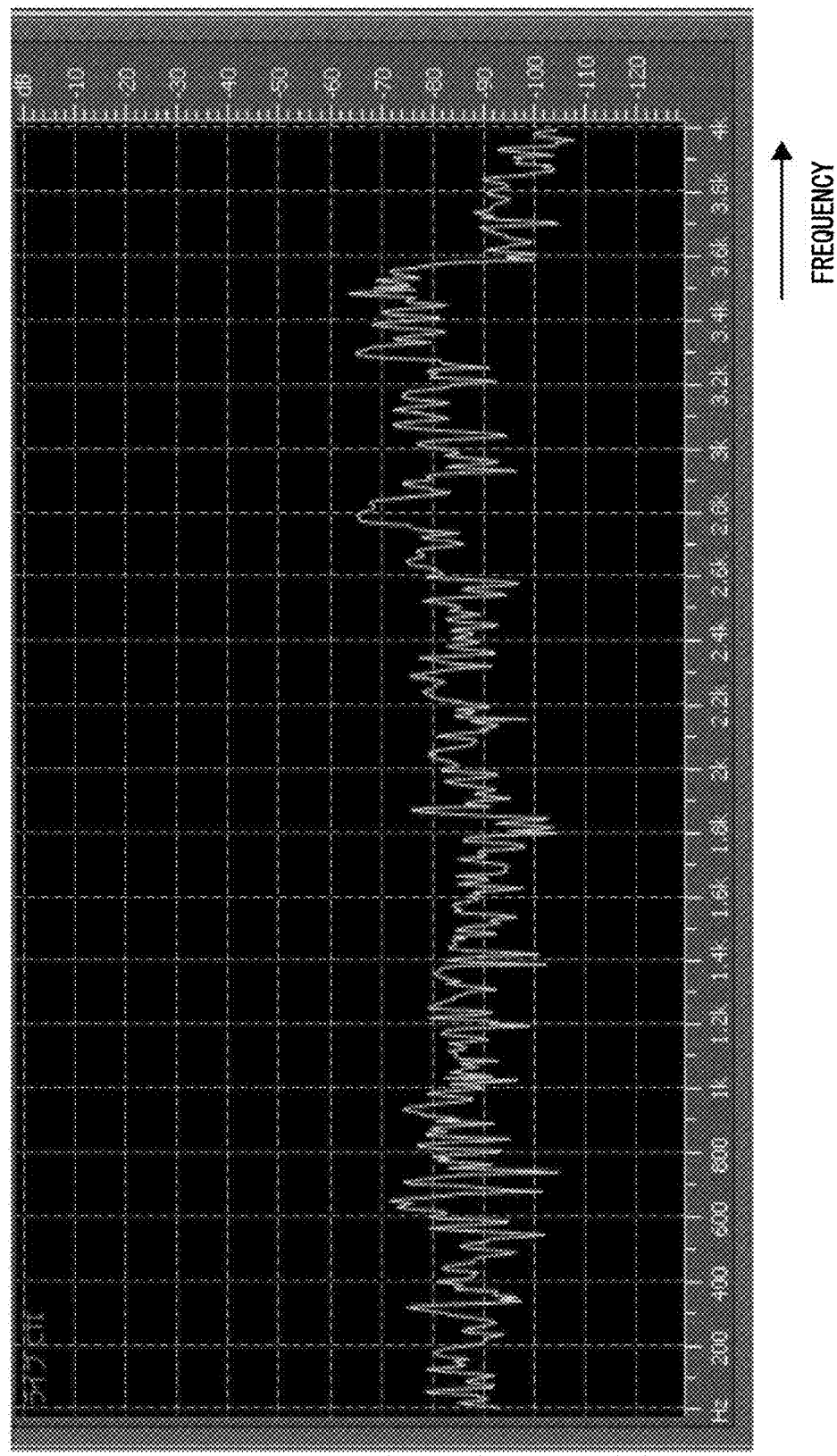
FIG. 15 is a graph for explaining a spectrum of the residual echo signal component of the voice signal on which the echo cancellation processing is performed by the echo cancellation device.

FIGS. 12 and 13 show graphs for explaining features of a voice signal on which the echo cancellation processing is not performed by the echo cancellation device. FIG. 12 is a graph for explaining a temporal waveform and a spectrogram of the voice signal. FIG. 13 is a graph for explaining a spectrum of the voice signal. FIGS. 14 and 15 are graphs for explaining residual echo signal components of the voice signal after the echo cancellation device performs the echo cancellation processing. FIG. 14 is a graph for explaining a temporal waveform and a spectrogram of the residual echo signal components. FIG. 15 is a graph for explaining a spectrum of the residual echo signal components.

Even in the case where the echo cancellation processing described in the first and second embodiments is performed, if the filter coefficient of the adaptive filter unit 31 includes an error, the echo signal cannot be completely cancelled due to the pseudo echo signal generated by the adaptive filter unit 31. In this case, the residual echo signal components shown in FIGS. 14 and 15 remain in the voice signal shown in FIGS. 12 and 13. The echo cancellation device 3 according to the third embodiment removes the residual echo signal components.

Figure 16:
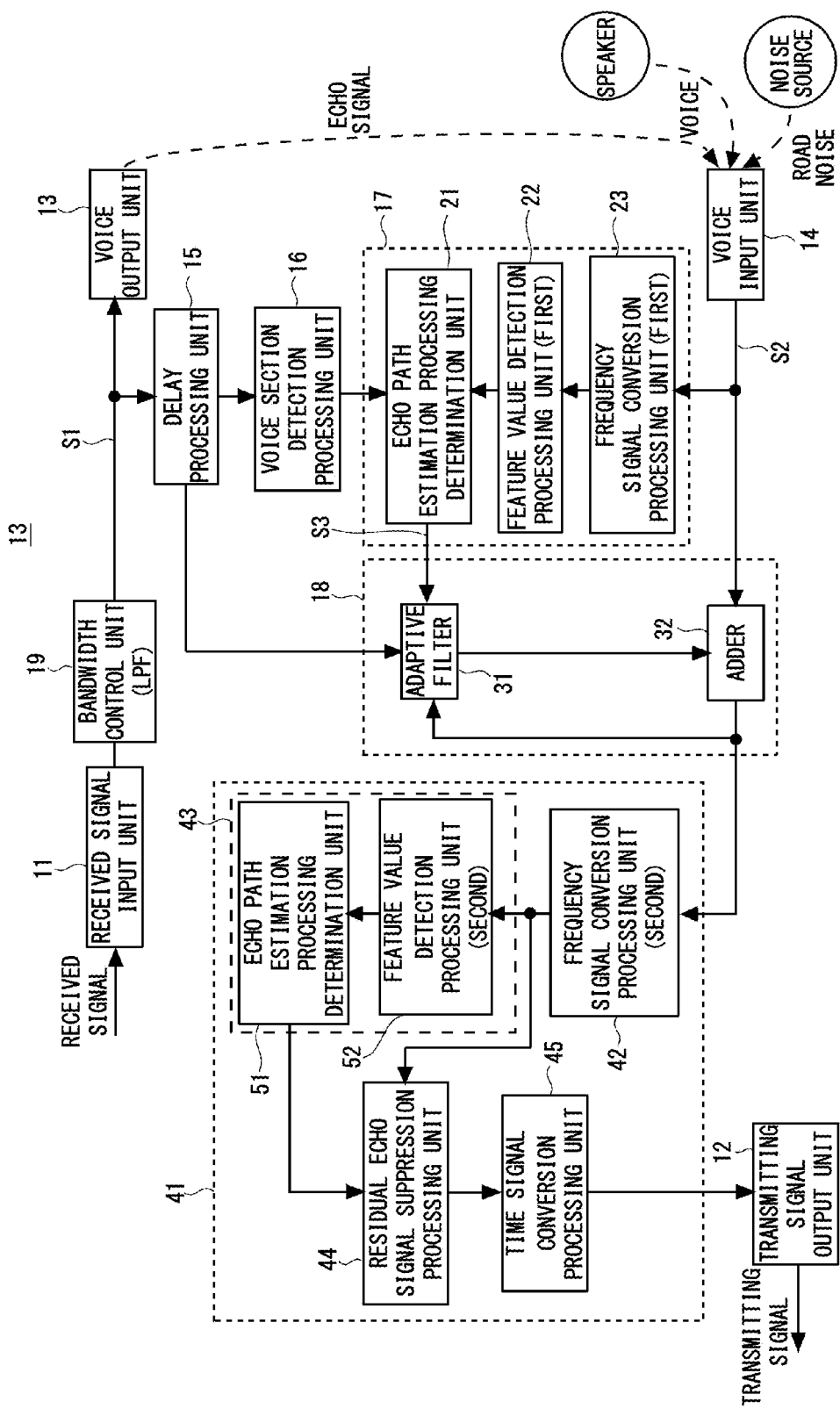
FIG. 16 is a block diagram of an echo cancellation device according to a third embodiment.

FIG. 16 shows a block diagram of the echo cancellation device 3 according to the third embodiment. As shown in FIG. 16, the echo cancellation device 3 according to the third embodiment has a configuration in which a residual echo signal suppressing unit 41 is incorporated between the echo signal reduction processing unit 18 and the transmitting signal output unit 12 of the echo cancellation device 1 according to the first embodiment.

The residual echo signal suppressing unit 41 receives, as a first transmitting signal, the transmitting signal output from the echo signal reduction processing unit 18, suppresses residual echo signal components included in the first transmitting signal, and outputs the resultant signal as a second transmitting signal. The residual echo signal suppressing unit 41 includes a frequency signal conversion processing unit 42, a residual echo signal attenuation processing determination unit 43, a residual echo signal suppression processing unit 44, and a time signal conversion processing unit 45. Note that the frequency signal conversion processing unit 42 and a feature value detection processing unit 52 in the residual echo signal attenuation processing determination unit 43 are blocks similar to the frequency signal conversion processing unit 23 and the feature value detection processing unit 22, respectively. Referring to FIG. 16, the feature value detection processing unit 22 serves as a first feature value detection processing unit; the frequency signal conversion processing unit 23 serves as a first frequency signal conversion processing unit; the frequency signal conversion processing unit 42 serves as a second frequency signal conversion processing unit; and the feature value detection processing unit 52 serves as a second feature value detection processing unit.

The frequency signal conversion processing unit 42 converts the first transmitting signal, which is subjected to the echo cancellation processing and output from the adder 32, from a time domain signal into a frequency domain signal (frequency signal). The frequency signal conversion processing unit 42 converts the first transmitting signal into a frequency signal by FFT or DCT.

The residual echo signal attenuation processing determination unit 43 determines whether or not a residual echo signal is present and determines whether or not to execute residual echo signal suppression processing. Accordingly, the residual echo signal attenuation processing determination unit 43 includes an echo path estimation processing determination unit 51 and the feature value detection processing unit 52.

The feature value detection processing unit 52 detects a feature value of a residual echo spectrum. As a method for calculating the feature value of the residual echo spectrum in the feature value detection processing unit 52, a method similar to the spectrum calculation method of the feature value detection processing unit 22 can be employed.

When the echo path estimation processing determination unit 51 determines that residual echo signal components are present based on the detected information about the residual echo spectrum that is detected by the feature value detection processing unit 52, the echo path estimation processing determination unit 51 instructs the residual echo signal suppression processing unit 44 to carry out the residual echo signal suppression processing.

The residual echo signal suppression processing unit 44 carries out stationary spectrum estimation processing, residual echo spectrum estimation processing, and residual echo spectrum suppression processing. In the stationary spectrum estimation processing, the information about the stationary spectrum intensity is updated when there is no residual echo and no voice is emitted from the speaker. The stationary spectrum information is updated by Formula (4). Note that in Formula (4), i represents the spectrum number.

[Formula 4]

$$\text{Stationary spectrum}[i] = (\text{stationary spectrum}[i] \times 0.99) + (\text{present spectrum}[i] \times 0.01) \quad (4)$$

In the residual echo spectrum estimation processing, residual echo signal components are detected, and when no voice is emitted from the speaker, the information about the remaining spectrum intensity is updated. The remaining spectrum information is updated by Formula (5). Note that in Formula (5), i represents the spectrum number.

[Formula 5]

$$\text{Residual spectrum}[i] = (\text{residual spectrum}[i] \times 0.99) + (\text{present spectrum}[i] \times 0.01) \quad (5)$$

In the residual echo spectrum suppression processing, the difference between the residual echo spectrum and the stationary echo spectrum is subtracted from the present spectrum signal, thereby suppressing the residual echo signal. A method for suppressing the residual echo spectrum is obtained by Formulas (6) and (7). Note that in Formula (6) and Formula (7), i represents the spectrum number.

[Formula 6]

$$\text{Spectrum suppression amount}[i] = (\text{residual spectrum}[i]) - (\text{stationary spectrum}[i]) \quad (6)$$

[Formula 7]

$$\text{Suppressed spectrum}[i] = (\text{present spectrum}[i]) - (\text{spectrum suppression amount}[i]) \quad (7)$$

The time signal conversion processing unit 45 performs frequency inverse transform processing for transforming the spectrum signal in which residual echo signal components are suppressed from a frequency domain to a time domain, thereby generating the second transmitting signal.

Figure 17:
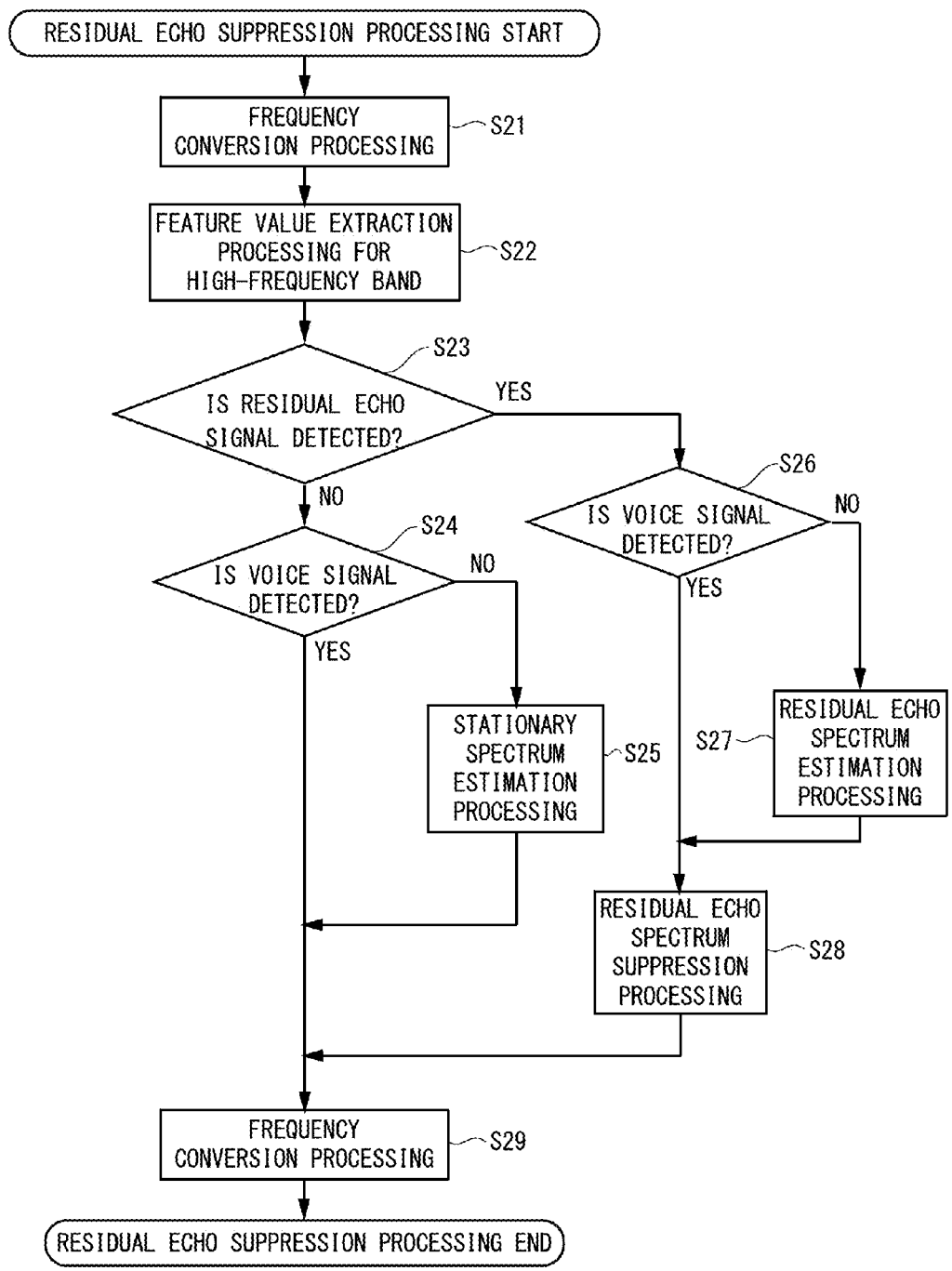
FIG. 17 is a flowchart for explaining an operation of the echo cancellation device according to the third embodiment.

Next, the operation of residual echo signal component suppression processing of the echo cancellation device 3 according to the third embodiment will be described with reference to the flowchart shown in FIG. 17. As shown in FIG. 17, in the echo cancellation device 3 according to the third embodiment, when the residual echo suppression processing is started, the frequency conversion processing (step S21) is performed by the frequency signal conversion processing unit 42 and the feature value extraction processing (step S22) in a high-frequency band is performed by the feature value detection processing unit 52.

Further, in the echo cancellation device 3, the echo path estimation processing determination unit 51 detects the residual echo signal based on the feature value extracted in step S22 (step S23). In this step S23, when it is determined that there are residual echo signal components (a branch of YES in step S23), the echo path estimation processing determination unit 51 detects the presence or absence of the voice signal (step S26). On the other hand, in step S23, also when it is determined that there are no residual echo signal components (a branch of NO in step S23), the echo path estimation processing determination unit 51 detects the presence or absence of the voice signal (step S24).

In step S24, when the voice signal is detected (a branch of YES in step S24), the echo cancellation device 3 performs time signal conversion processing on the first transmitting signal (step S29), without performing the echo signal suppression processing, and terminates the residual echo suppression processing. On the other hand, in step S24, when the voice signal is not detected (a branch of NO in step S24), the residual echo signal suppression processing unit 44 performs the stationary spectrum estimation processing (step S25) and then performs the time signal conversion processing on the first transmitting signal (step S29) and terminates the residual echo suppression processing.

In step S26, when the voice signal is detected (a branch of YES in step S27), the residual echo signal suppression processing unit 44 performs the residual echo spectrum suppression processing (step S28), and then performs the time signal conversion processing on the first transmitting signal subjected to the residual echo spectrum suppression processing (step S29), and terminates the residual echo suppression processing. On the other hand, in step S26, when the voice signal is not detected (a branch of NO in step S26), the residual echo signal suppression processing unit 44 performs the residual echo spectrum estimation processing (step S27) and then performs the residual echo spectrum suppression processing (step S28). After that, the echo cancellation device 3 performs the time signal conversion processing on the first transmitting signal subjected to the residual echo spectrum suppression processing (step S29), and terminates the residual echo suppression processing.

As described above, the echo cancellation device 3 according to the third embodiment performs suppression processing on the echo signal components remaining after the echo cancellation processing. Consequently, the echo cancellation device 3 according to the third embodiment provides an echo cancellation effect higher than that of the echo cancellation device 1 according to the first embodiment.

Note that this embodiment is not limited to the above embodiments, and can be modified as appropriate without departing from the scope of the invention.

The invention claimed is:

1. An echo cancellation device comprising:
   a voice output unit configured to output, to a space, an output voice signal in which frequency components equal to or higher than a predetermined target frequency are suppressed, as a first voice signal;
a voice input unit configured to pick up a second voice signal propagating through the space and generate an acoustic signal including a frequency component higher than the predetermined target frequency;
a delay processing unit configured to delay the output voice signal;
a voice section detection processing unit configured to detect that the output voice signal delayed by the delay processing unit corresponds to a voice section including a voice signal component, and generate voice section information;
a filter coefficient update determination unit configured to determine whether or not the acoustic signal includes an echo signal component corresponding to the output voice signal when the voice section information indicates the voice section, and enable a coefficient update signal when the filter coefficient update determination unit determines that the acoustic signal includes the echo signal component; and
an echo signal reduction processing unit configured to update a filter coefficient for setting a degree of suppression of the echo signal component from the acoustic signal according to the coefficient update signal, and generate, from the acoustic signal, a transmitting signal in which the echo signal component is reduced,
wherein the filter coefficient update determination unit calculates a feature value of the acoustic signal and enables the coefficient update signal when a difference between a first feature value of a frequency band equal to or lower than the predetermined target frequency and a second feature value of the frequency band higher than the predetermined target frequency is equal to or greater than a preset update determination threshold.

2. The echo cancellation device according to claim 1, further comprising a bandwidth control unit configured to generate the output voice signal by controlling a bandwidth of a frequency equal to or higher than the predetermined target frequency of a received signal externally received, and output the generated output voice signal to the voice output unit and the delay processing unit.

3. The echo cancellation device according to claim 1, wherein the output voice signal is a signal with a sampling rate lower than that of the acoustic signal.

4. The echo cancellation device according to claim 1, wherein the filter coefficient update determination unit disables the coefficient update signal when the voice section information indicates the voice section and the acoustic signal includes a voice component of a speaker.

5. The echo cancellation device according to claim 1, wherein
the filter coefficient update determination unit includes:
a frequency signal conversion processing unit configured to convert the acoustic signal into a frequency signal;
a feature value detection processing unit configured to calculate the first feature value and the second feature value from the frequency signal obtained through the conversion by the frequency signal conversion processing unit; and
an echo path estimation processing determination unit configured to enable the coefficient update signal when the voice section information indicates the voice section and a difference between the first feature value and the second feature value is equal to or greater than a preset update determination threshold.

6. The echo cancellation device according to claim 1, wherein
the echo signal reduction processing unit includes an adaptive filter unit and an addition unit,
the adaptive filter unit updates the filter coefficient according to the coefficient update signal and generates a pseudo echo signal based on the output voice signal delayed by the delay processing unit and a transmitting signal output from the addition unit, and
the addition unit subtracts the pseudo echo signal from the acoustic signal and outputs the transmitting signal.

7. The echo cancellation device according to claim 1, further comprising a residual echo signal suppressing unit configured to receive the transmitting signal as a first transmitting signal, suppress a residual echo signal component included in the first transmitting signal, and output a resultant signal as a second transmitting signal.

8. A non-transitory computer readable medium storing an echo cancellation program that suppresses an echo signal component corresponding to an output voice signal in an echo cancellation device,
the echo cancellation device comprising:
a voice output unit configured to output, to a space, the output voice signal in which frequency components equal to or higher than a predetermined target frequency are suppressed, as a first voice signal;
a voice input unit configured to pick up a second voice signal propagating through the space and generate an acoustic signal including a frequency component higher than the predetermined target frequency; and
an operation unit configured to execute a program,
the echo cancellation program comprising:
delay processing for delaying the output voice signal;
voice section detection processing for detecting that the output voice signal delayed by the delay processing corresponds to a voice section including a voice signal component, and generating voice section information;
echo signal reduction processing for updating a filter coefficient for setting a degree of suppression of the echo signal component from the acoustic signal, and generating, from the acoustic signal, a transmitting signal in which the echo signal component is reduced; and
filter coefficient update determination processing for determining whether or not the acoustic signal includes an echo signal component corresponding to the output voice signal when the voice section information indicates the voice section, and updating the filter coefficient when the filter coefficient update determination processing determines that the acoustic signal includes the echo signal component,
wherein in the filter coefficient update determination processing, a feature value of the acoustic signal is calculated and an instruction to update the filter coefficient is sent when a difference between a first feature value of a frequency band equal to or lower than the predetermined target frequency and a second feature value of the frequency band higher than the predetermined target frequency is equal to or greater than a preset update determination threshold.

9. An echo cancellation method that suppresses an echo signal component corresponding to an output voice signal in an echo cancellation device, the echo cancellation device comprising:
  a voice output unit configured to output, to a space, an output voice signal in which frequency components equal to or higher than a predetermined target frequency are suppressed, as a first voice signal; and
  a voice input unit configured to pick up a second voice signal propagating through the space and generate an acoustic signal including a frequency component higher than the predetermined target frequency,
the echo cancellation method comprising:
  delaying the output voice signal;
  detecting that the delayed output voice signal corresponds to a voice section including a voice signal component and generating voice section information;
  updating a filter coefficient for setting a degree of suppression of the echo signal component from the acoustic signal, and generating, from the acoustic signal, a transmitting signal in which the echo signal component is reduced;
  calculating a feature value of the acoustic signal and calculating, as an echo signal determination value, a difference between a first feature value of a frequency band equal to or lower than the predetermined target frequency and a second feature value of the frequency band higher than the predetermined target frequency; and
  determining that the acoustic signal includes an echo signal component corresponding to the output voice signal when the voice section information indicates the voice section and the echo signal determination value is equal to or greater than a preset update determination threshold, and sending an instruction to update the filter coefficient.

* * * * *